US009477737B1

(12) United States Patent
Charyk et al.

(10) Patent No.: US 9,477,737 B1
(45) Date of Patent: Oct. 25, 2016

(54) SYSTEMS AND USER INTERFACES FOR DYNAMIC ACCESS OF MULTIPLE REMOTE DATABASES AND SYNCHRONIZATION OF DATA BASED ON USER RULES

(71) Applicant: ConsumerInfo.com, Inc., Costa Mesa, CA (US)

(72) Inventors: Mike Charyk, Huntington Beach, CA (US); Nelson Yu, El Monte, CA (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 36 days.

(21) Appl. No.: 14/548,016

(22) Filed: Nov. 19, 2014

Related U.S. Application Data

(60) Provisional application No. 61/906,786, filed on Nov. 20, 2013.

(51) Int. Cl.

| | |
|---|---|
| ***G06F 17/30*** | (2006.01) |
| ***G06F 21/00*** | (2013.01) |
| ***H04L 29/06*** | (2006.01) |
| ***G06F 21/62*** | (2013.01) |
| ***G06F 3/0484*** | (2013.01) |
| *H04L 7/00* | (2006.01) |

(52) U.S. Cl.
CPC ..... *G06F 17/30575* (2013.01); *G06F 3/04842* (2013.01); *G06F 17/30371* (2013.01); *G06F 21/6218* (2013.01); *H04L 63/08* (2013.01); *H04L 63/0815* (2013.01)

(58) Field of Classification Search
CPC .. G06Q 40/025; G06Q 20/206; H04L 63/08; H04L 67/1095; H04L 67/306; H04L 63/0815; Y10S 707/99943; Y10S 707/99931; G06F 17/30575; G06F 3/04842; G06F 21/6218; G06F 17/30371; G06F 17/30557; G06F 21/41
See application file for complete search history.

(56) References Cited

U.S. PATENT DOCUMENTS

| | | | |
|---|---|---|---|
| 3,405,457 | A | 10/1968 | Bitzer |
| 4,346,442 | A | 8/1982 | Musmanno |
| 4,734,858 | A | 3/1988 | Schlafly |
| 4,755,940 | A | 7/1988 | Brachtl et al. |
| 4,774,664 | A | 9/1988 | Campbell et al. |
| 4,891,503 | A | 1/1990 | Jewell |
| 4,977,595 | A | 12/1990 | Ohta et al. |
| 4,989,141 | A | 1/1991 | Lyons et al. |
| 5,126,936 | A | 6/1992 | Champion et al. |

(Continued)

FOREIGN PATENT DOCUMENTS

| | | |
|---|---|---|
| EP | 0 542 298 | 5/1993 |
| EP | 1 239 378 | 1/2002 |

(Continued)

OTHER PUBLICATIONS

U.S. Appl. No. 12/705,489, filed Feb. 12, 2010, Bargoli et al.

(Continued)

*Primary Examiner* — Michael Simitoski
(74) *Attorney, Agent, or Firm* — Knobbe, Martens, Olson & Bear, LLP

(57) ABSTRACT

A computing system is configured to access a plurality of remote databases in order to identify data inconsistencies between the remote databases and provide user interfaces to a user in order to initiate communication via one or more APIs to certain remote databases indicating updates that reconcile said data inconsistencies.

15 Claims, 9 Drawing Sheets

(56) References Cited

U.S. PATENT DOCUMENTS 5,148,365 A 9/1992 Dembo
5,220,501 A 6/1993 Lawlor et al.
5,274,547 A 12/1993 Zoffel et al.
5,336,870 A 8/1994 Hughes et al.
5,383,113 A 1/1995 Kight et al.
5,404,518 A 4/1995 Gilbertson et al.
5,500,513 A 3/1996 Langhans et al.
5,590,038 A 12/1996 Pitroda
5,592,560 A 1/1997 Deaton et al.
5,640,577 A 6/1997 Scharmer
5,659,725 A 8/1997 Levy et al.
5,659,731 A 8/1997 Gustafson
5,719,941 A 2/1998 Swift et al.
5,729,735 A * 3/1998 Meyering .......... G06F 11/1451
5,739,512 A 4/1998 Tognazzini
5,754,632 A 5/1998 Smith
5,819,234 A 10/1998 Slavin et al.
5,832,068 A 11/1998 Smith
5,842,211 A 11/1998 Horadan et al.
5,844,218 A 12/1998 Kawan et al.
5,878,403 A 3/1999 DeFrancesco et al.
5,881,131 A 3/1999 Farris et al.
5,884,302 A 3/1999 Ho
5,903,830 A 5/1999 Joao et al.
5,903,881 A 5/1999 Schrader et al.
5,956,693 A 9/1999 Geerlings
5,963,939 A 10/1999 McCann et al.
5,966,695 A 10/1999 Melchione et al.
5,978,780 A 11/1999 Watson
5,995,947 A 11/1999 Fraser et al.
5,999,596 A 12/1999 Walker et al.
6,006,333 A 12/1999 Nielsen
6,009,415 A 12/1999 Shurling et al.
6,021,397 A 2/2000 Jones et al.
6,021,943 A 2/2000 Chastain
6,026,440 A 2/2000 Shrader et al.
6,038,551 A 3/2000 Barlow et al.
6,064,990 A 5/2000 Goldsmith
6,072,894 A 6/2000 Payne
6,073,140 A 6/2000 Morgan et al.
6,085,242 A 7/2000 Chandra
6,088,686 A 7/2000 Walker et al.
6,119,103 A 9/2000 Basch et al.
6,128,602 A 10/2000 Northington et al.
6,149,441 A 11/2000 Pellegrino et al.
6,157,707 A 12/2000 Baulier et al.
6,161,139 A 12/2000 Win et al.
6,178,420 B1 1/2001 Sassano
6,182,068 B1 1/2001 Culliss
6,182,229 B1 1/2001 Nielsen
6,202,053 B1 3/2001 Christiansen et al.
6,202,067 B1 * 3/2001 Blood ................ G06F 11/1474 707/613
6,233,566 B1 5/2001 Levine et al.
6,247,000 B1 6/2001 Hawkins et al.
6,254,000 B1 7/2001 Degen et al.
6,263,447 B1 7/2001 French et al.
6,282,658 B2 8/2001 French et al.
6,295,541 B1 * 9/2001 Bodnar ............ G06F 17/30353
6,304,860 B1 10/2001 Martin et al.
6,311,169 B2 10/2001 Duhon
6,321,339 B1 11/2001 French et al.
6,327,578 B1 12/2001 Linehan
6,330,551 B1 12/2001 Burchetta et al.
6,343,279 B1 1/2002 Bissonette et al.
6,353,778 B1 3/2002 Brown
6,356,937 B1 3/2002 Montville et al.
6,374,262 B1 * 4/2002 Kodama .......... G06F 17/30575 707/623
6,384,844 B1 5/2002 Stewart et al.
6,386,444 B1 5/2002 Sullivan
6,397,197 B1 5/2002 Gindlesperger
6,397,212 B1 5/2002 Biffar
6,421,675 B1 7/2002 Ryan et al.
6,422,462 B1 7/2002 Cohen
6,453,353 B1 9/2002 Win et al.
6,457,012 B1 9/2002 Jatkowski
6,496,936 B1 12/2002 French et al.
6,523,021 B1 2/2003 Monberg et al.
6,523,041 B1 2/2003 Morgan et al.
6,539,377 B1 3/2003 Culliss
6,539,392 B1 3/2003 Rebane
6,543,683 B2 4/2003 Hoffman
6,564,210 B1 5/2003 Korda et al.
6,571,236 B1 5/2003 Ruppelt
6,574,736 B1 6/2003 Andrews
6,581,025 B2 6/2003 Lehman
6,587,841 B1 7/2003 DeFrancesco
6,615,193 B1 9/2003 Kingdon et al.
6,629,245 B1 9/2003 Stone et al.
6,647,383 B1 11/2003 August et al.
6,658,393 B1 12/2003 Basch et al.
6,665,715 B1 12/2003 Houri
6,678,694 B1 1/2004 Zimmermann et al.
6,703,930 B2 3/2004 Skinner
6,714,944 B1 3/2004 Shapiro et al.
6,725,381 B1 4/2004 Smith et al.
6,745,938 B2 6/2004 Sullivan
6,750,985 B2 6/2004 Rhoads
6,766,327 B2 7/2004 Morgan, Jr. et al.
6,781,608 B1 8/2004 Crawford
6,782,379 B2 8/2004 Lee
6,792,088 B2 9/2004 Takeuchi
6,792,263 B1 9/2004 Kite
6,796,497 B2 9/2004 Benkert et al.
6,804,346 B1 10/2004 Mewhinney
6,805,287 B2 10/2004 Bishop et al.
6,816,850 B2 11/2004 Culliss
6,816,871 B2 11/2004 Lee
6,845,448 B1 1/2005 Chaganti et al.
6,857,073 B2 2/2005 French et al.
6,871,287 B1 3/2005 Ellingson
6,892,307 B1 5/2005 Wood et al.
6,900,731 B2 5/2005 Kreiner et al.
6,910,624 B1 6/2005 Natsuno
6,928,487 B2 8/2005 Eggebraaten et al.
6,934,714 B2 8/2005 Meinig
6,941,323 B1 9/2005 Galperin
6,947,989 B2 9/2005 Gullotta et al.
6,950,807 B2 9/2005 Brock
6,962,336 B2 11/2005 Glass
6,965,881 B1 11/2005 Brickell et al.
6,968,319 B1 11/2005 Remington et al.
6,973,462 B2 12/2005 Dattero et al.
6,985,887 B1 1/2006 Sunstein et al.
6,988,085 B2 1/2006 Hedy
6,999,941 B1 2/2006 Agarwal
7,013,315 B1 * 3/2006 Boothby .......... G06F 17/30575
7,016,907 B2 3/2006 Boreham et al.
7,028,013 B2 4/2006 Saeki
7,028,052 B2 4/2006 Chapman et al.
7,039,607 B2 5/2006 Watarai et al.
7,043,476 B2 5/2006 Robson
7,046,139 B2 5/2006 Kuhn et al.
7,058,386 B2 6/2006 McGregor et al.
7,058,817 B1 6/2006 Ellmore
7,062,475 B1 6/2006 Szabo et al.
7,069,240 B2 6/2006 Spero et al.
7,072,909 B2 7/2006 Polk
7,076,462 B1 7/2006 Nelson et al.
7,085,727 B2 8/2006 VanOrman
7,089,594 B2 8/2006 Lal et al.
7,107,241 B1 9/2006 Pinto
7,117,172 B1 10/2006 Black
7,124,144 B2 10/2006 Christianson et al.
7,155,739 B2 12/2006 Bari et al.
7,181,418 B1 2/2007 Zucker et al.
7,181,427 B1 2/2007 DeFrancesco
7,194,416 B1 3/2007 Provost et al.
7,200,602 B2 4/2007 Jonas
7,209,895 B2 4/2007 Kundtz et al.
7,209,911 B2 * 4/2007 Boothby .......... G06F 17/30575
7,218,912 B2 5/2007 Erskine et al.
7,219,107 B2 5/2007 Beringer

(56) References Cited

U.S. PATENT DOCUMENTS 7,222,369 B2 5/2007 Vering et al.
7,234,156 B2 6/2007 French et al.
7,236,950 B2 6/2007 Savage et al.
7,243,369 B2 7/2007 Bhat et al.
7,246,740 B2 7/2007 Swift et al.
7,249,076 B1 7/2007 Pendleton et al.
7,249,113 B1 7/2007 Continelli et al.
7,263,497 B1 8/2007 Wiser et al.
7,281,652 B2 10/2007 Foss
7,289,971 B1 10/2007 O'Neil et al.
7,296,734 B2 11/2007 Pliha
7,302,272 B2 11/2007 Ackley
7,310,611 B2 12/2007 Shibuya et al.
7,310,617 B1 12/2007 Cunningham
7,314,167 B1 1/2008 Kiliccote
7,315,837 B2 1/2008 Sloan et al.
7,328,233 B2 2/2008 Salim et al.
7,330,717 B2 2/2008 Gidron et al.
7,330,835 B2 2/2008 Deggendorf
7,333,635 B2 2/2008 Tsantes et al.
7,340,679 B2 3/2008 Botscheck et al.
7,343,149 B2 3/2008 Benco et al.
7,343,295 B2 3/2008 Pomerance
7,356,516 B2 4/2008 Richey et al.
7,366,694 B2 4/2008 Lazerson
7,370,044 B2 5/2008 Mulhern et al.
7,373,324 B1 5/2008 Engin et al.
7,383,988 B2 6/2008 Slonecker, Jr.
7,386,511 B2 6/2008 Buchanan et al.
7,389,913 B2 6/2008 Starrs
7,395,273 B2 7/2008 Khan et al.
7,403,942 B1 7/2008 Bayliss
7,409,369 B1 8/2008 Homuth et al.
7,412,228 B2 8/2008 Barclay et al.
7,433,864 B2 10/2008 Malik
7,437,679 B2 10/2008 Uemura et al.
7,444,518 B1 10/2008 Dharmarajan et al.
7,451,095 B1 11/2008 Bradley et al.
7,451,113 B1 11/2008 Kasower
7,458,508 B1 12/2008 Shao et al.
7,467,401 B2 12/2008 Cicchitto
7,475,032 B1 1/2009 Patnode et al.
7,479,949 B2 1/2009 Jobs et al.
7,480,631 B1 1/2009 Merced et al.
7,490,356 B2 2/2009 Lieblich et al.
7,503,489 B2 3/2009 Heffez
7,509,117 B2 3/2009 Yum
7,509,278 B2 3/2009 Jones
7,512,221 B2 3/2009 Toms
7,529,698 B2 5/2009 Joao
7,530,097 B2 5/2009 Casco-Arias et al.
7,536,329 B2 5/2009 Goldberg et al.
7,536,348 B2 5/2009 Shao et al.
7,542,993 B2 6/2009 Satterfield et al.
7,543,739 B2 6/2009 Brown et al.
7,546,271 B1 6/2009 Chmielewski et al.
7,548,886 B2 6/2009 Kirkland et al.
7,552,086 B1 6/2009 Rajasekar et al.
7,552,089 B2 6/2009 Bruer et al.
7,552,467 B2 6/2009 Lindsay
7,559,217 B2 7/2009 Bass
7,562,184 B2 7/2009 Henmi et al.
7,562,814 B1 7/2009 Shao et al.
7,571,138 B2 8/2009 Miri et al.
7,571,473 B1 8/2009 Boydstun et al.
7,575,157 B2 8/2009 Barnhardt et al.
7,577,665 B2 8/2009 Ramer et al.
7,577,934 B2 8/2009 Anonsen et al.
7,580,884 B2 8/2009 Cook
7,581,112 B2 8/2009 Brown et al.
7,584,126 B1 9/2009 White
7,587,368 B2 9/2009 Felsher
7,593,891 B2 9/2009 Kornegay et al.
7,594,019 B2 9/2009 Clapper
7,610,216 B1 10/2009 May et al.
7,610,229 B1 10/2009 Kornegay
7,613,600 B2 11/2009 Krane
7,620,596 B2 11/2009 Knudson et al.
7,623,844 B2 11/2009 Herrmann et al.
7,630,903 B1 12/2009 Vaidyanathan
7,634,737 B2 12/2009 Beringer et al.
7,640,200 B2 12/2009 Gardner et al.
7,644,035 B1 1/2010 Biffle et al.
7,647,274 B2 1/2010 Peterson et al.
7,647,344 B2 1/2010 Skurtovich, Jr. et al.
7,653,592 B1 1/2010 Flaxman et al.
7,653,600 B2 1/2010 Gustin et al.
7,653,688 B2 1/2010 Bittner
7,672,833 B2 3/2010 Blume et al.
7,685,209 B1 3/2010 Norton et al.
7,686,214 B1 3/2010 Shao et al.
7,688,813 B2 3/2010 Shin et al.
7,689,487 B1 3/2010 Britto et al.
7,689,505 B2 3/2010 Kasower
7,689,563 B1 3/2010 Jacobson
7,690,032 B1 3/2010 Peirce
7,693,787 B2 4/2010 Provinse
7,698,214 B1 4/2010 Lindgren
7,698,217 B1 4/2010 Phillips et al.
7,707,122 B2 4/2010 Hull et al.
7,707,271 B2 4/2010 Rudkin et al.
7,708,190 B2 5/2010 Brandt et al.
7,711,635 B2 5/2010 Steele et al.
7,711,707 B2 * 5/2010 Kelley .............. G06F 17/30884 707/622
7,715,832 B2 5/2010 Zhou
7,720,846 B1 * 5/2010 Bayliss ............. G06F 17/30598 707/736
7,725,385 B2 5/2010 Royer et al.
7,729,959 B1 6/2010 Wells et al.
7,730,078 B2 6/2010 Schwabe et al.
7,739,707 B2 6/2010 Sie et al.
7,747,520 B2 6/2010 Livermore et al.
7,747,521 B2 6/2010 Serio
7,756,789 B2 7/2010 Welker et al.
7,761,373 B2 7/2010 Metz
7,761,384 B2 7/2010 Madhogarhia
7,765,148 B2 7/2010 German et al.
7,765,166 B2 7/2010 Beringer et al.
7,769,697 B2 8/2010 Fieschi et al.
7,774,257 B2 8/2010 Maggioncalda et al.
7,774,270 B1 8/2010 MacCloskey
7,783,515 B1 8/2010 Kumar et al.
7,787,869 B2 8/2010 Rice et al.
7,788,040 B2 8/2010 Haskell et al.
7,792,715 B1 9/2010 Kasower
7,792,725 B2 9/2010 Booraem et al.
7,792,903 B2 9/2010 Fischer et al.
7,793,835 B1 9/2010 Coggeshall et al.
7,797,252 B2 9/2010 Rosskamm et al.
7,801,807 B2 9/2010 DeFrancesco et al.
7,801,811 B1 9/2010 Merrell et al.
7,801,956 B1 9/2010 Cumberbatch et al.
7,802,104 B2 9/2010 Dickinson et al.
7,805,362 B1 9/2010 Merrell et al.
7,809,398 B2 10/2010 Pearson
7,809,797 B2 10/2010 Cooley et al.
7,810,036 B2 10/2010 Bales et al.
7,814,002 B2 10/2010 DeFrancesco et al.
7,814,005 B2 10/2010 Imrey et al.
7,818,228 B1 10/2010 Coulter
7,818,229 B2 10/2010 Imrey et al.
7,827,115 B2 11/2010 Weller et al.
7,832,006 B2 11/2010 Chen et al.
7,840,484 B2 11/2010 Haggerty et al.
7,841,004 B1 11/2010 Balducci et al.
7,841,008 B1 11/2010 Cole et al.
7,844,520 B1 11/2010 Franklin
7,844,604 B2 11/2010 Baio et al.
7,848,972 B1 12/2010 Sharma
7,848,978 B2 12/2010 Imrey et al.
7,849,014 B2 12/2010 Erikson
7,853,493 B2 12/2010 DeBie et al.
7,856,203 B2 12/2010 Lipovski

(56) References Cited

U.S. PATENT DOCUMENTS 7,856,386 B2 12/2010 Hazlehurst et al.
7,870,066 B2 1/2011 Lin et al.
7,870,078 B2 1/2011 Clark et al.
7,877,304 B1 1/2011 Coulter
7,877,784 B2 1/2011 Chow et al.
7,890,403 B1 2/2011 Smith
7,899,750 B1 3/2011 Klieman et al.
7,908,242 B1 3/2011 Achanta
7,909,246 B2 3/2011 Hogg et al.
7,912,842 B1 * 3/2011 Bayliss ............. G06F 17/30303 707/749
7,912,865 B2 3/2011 Akerman et al.
7,925,582 B1 4/2011 Kornegay et al.
7,925,982 B2 4/2011 Parker
7,954,698 B1 6/2011 Pliha
7,958,046 B2 6/2011 Doerner et al.
7,966,192 B2 6/2011 Pagliari et al.
7,970,679 B2 6/2011 Kasower
7,975,299 B1 7/2011 Balducci et al.
7,979,908 B2 7/2011 Millwee
7,983,932 B2 7/2011 Kane
7,987,501 B2 * 7/2011 Miller .................... G06F 21/41 713/182
8,001,153 B2 8/2011 Skurtovich, Jr. et al.
8,001,235 B2 8/2011 Russ et al.
8,032,932 B2 10/2011 Speyer et al.
8,037,097 B2 10/2011 Guo et al.
8,055,904 B1 11/2011 Cato et al.
8,060,424 B2 11/2011 Kasower
8,060,916 B2 11/2011 Bajaj et al.
8,065,233 B2 11/2011 Lee et al.
8,078,453 B2 12/2011 Shaw
8,078,524 B2 12/2011 Crawford et al.
8,078,527 B2 12/2011 Cerise et al.
8,078,528 B1 12/2011 Vicente et al.
8,078,881 B1 12/2011 Liu
8,095,443 B2 1/2012 DeBie
8,095,458 B2 1/2012 Peterson et al.
8,099,309 B1 1/2012 Bober
8,099,341 B2 1/2012 Varghese
8,104,679 B2 1/2012 Brown
8,127,982 B1 3/2012 Casey et al.
8,127,986 B1 3/2012 Taylor et al.
8,131,685 B1 3/2012 Gedalius et al.
8,131,777 B2 3/2012 McCullough
8,160,960 B1 4/2012 Fei et al.
8,175,889 B1 5/2012 Girulat et al.
8,195,549 B2 6/2012 Kasower
8,201,257 B1 6/2012 Andres et al.
8,204,812 B2 6/2012 Stewart et al.
8,224,723 B2 7/2012 Bosch et al.
8,234,498 B2 7/2012 Britti et al.
8,244,848 B1 8/2012 Narayanan et al.
8,249,968 B1 8/2012 Oldham et al.
8,271,393 B2 9/2012 Twining et al.
8,281,372 B1 10/2012 Vidal
8,285,613 B1 10/2012 Coulter
8,285,656 B1 10/2012 Chang et al.
8,290,840 B2 10/2012 Kasower
8,290,856 B1 10/2012 Kasower
8,296,229 B1 10/2012 Yellin et al.
8,312,033 B1 11/2012 McMillan
8,321,339 B2 11/2012 Imrey et al.
8,327,429 B2 12/2012 Speyer et al.
8,355,967 B2 1/2013 Debie et al.
8,374,973 B2 2/2013 Herbrich et al.
8,412,593 B1 4/2013 Song et al.
8,433,654 B2 4/2013 Subbarao et al.
8,456,293 B1 6/2013 Trundle et al.
8,464,939 B1 6/2013 Taylor et al.
8,473,318 B2 6/2013 Nielson et al.
8,478,674 B1 7/2013 Kapczynski et al.
8,484,186 B1 7/2013 Kapczynski et al.
8,515,828 B1 8/2013 Wolf et al.
8,515,844 B2 8/2013 Kasower
8,527,357 B1 9/2013 Ganesan
8,533,118 B2 9/2013 Weller et al.
8,560,436 B2 10/2013 Ingram et al.
8,560,447 B1 10/2013 Hinghole et al.
8,572,083 B1 10/2013 Snell et al.
8,578,496 B1 11/2013 Krishnappa
8,600,886 B2 12/2013 Ramavarjula et al.
8,601,602 B1 12/2013 Zheng
8,606,694 B2 12/2013 Campbell et al.
8,630,938 B2 1/2014 Cheng et al.
8,646,051 B2 2/2014 Paden et al.
8,705,718 B2 4/2014 Baniak et al.
8,706,599 B1 4/2014 Koenig et al.
8,725,613 B1 5/2014 Celka et al.
8,738,516 B1 5/2014 Dean et al.
8,768,914 B2 7/2014 Scriffignano et al.
8,781,953 B2 7/2014 Kasower
8,782,217 B1 7/2014 Arone et al.
8,818,888 B1 8/2014 Kapczynski et al.
8,856,894 B1 10/2014 Dean et al.
8,930,251 B2 1/2015 DeBie
8,930,263 B1 1/2015 Mahacek et al.
8,938,399 B1 * 1/2015 Herman ............... G06Q 20/401 705/50
8,949,981 B1 2/2015 Trollope et al.
8,954,459 B1 2/2015 McMillan et al.
8,972,400 B1 3/2015 Kapczynski et al.
9,058,627 B1 6/2015 Wasser et al.
9,106,691 B1 8/2015 Burger et al.
9,147,042 B1 9/2015 Haller et al.
9,230,283 B1 1/2016 Taylor et al.
9,256,904 B1 * 2/2016 Haller .................... G06Q 40/00
2001/0029470 A1 10/2001 Schultz et al.
2001/0029482 A1 10/2001 Tealdi et al.
2001/0037204 A1 11/2001 Horn et al.
2001/0037289 A1 11/2001 Mayr et al.
2001/0039532 A1 11/2001 Coleman, Jr. et al.
2001/0039563 A1 11/2001 Tian
2001/0042785 A1 11/2001 Walker et al.
2001/0044729 A1 11/2001 Pomerance
2001/0044756 A1 11/2001 Watkins et al.
2001/0047332 A1 11/2001 Gonen-Friedman et al.
2001/0049274 A1 12/2001 Degraeve
2002/0010616 A1 1/2002 Itzhaki
2002/0013827 A1 1/2002 Edstrom et al.
2002/0013899 A1 1/2002 Faul
2002/0029192 A1 3/2002 Nakagawa et al.
2002/0032635 A1 3/2002 Harris et al.
2002/0033846 A1 3/2002 Balasubramanian et al.
2002/0035480 A1 3/2002 Gordon et al.
2002/0045154 A1 4/2002 Wood et al.
2002/0052841 A1 5/2002 Guthrie et al.
2002/0055906 A1 5/2002 Katz et al.
2002/0059139 A1 5/2002 Evans
2002/0059201 A1 5/2002 Work
2002/0069122 A1 6/2002 Yun et al.
2002/0069182 A1 6/2002 Dwyer
2002/0072927 A1 6/2002 Phelan et al.
2002/0077964 A1 6/2002 Brody et al.
2002/0087460 A1 7/2002 Hornung
2002/0099635 A1 7/2002 Guiragosian
2002/0103933 A1 8/2002 Garon et al.
2002/0111816 A1 8/2002 Lortscher et al.
2002/0111890 A1 8/2002 Sloan et al.
2002/0120757 A1 8/2002 Sutherland et al.
2002/0120846 A1 8/2002 Stewart et al.
2002/0128962 A1 9/2002 Kasower
2002/0133365 A1 9/2002 Grey et al.
2002/0133462 A1 9/2002 Shteyn
2002/0138409 A1 9/2002 Bass
2002/0138470 A1 9/2002 Zhou
2002/0143943 A1 10/2002 Lee et al.
2002/0147801 A1 10/2002 Gullotta et al.
2002/0152166 A1 10/2002 Dutta et al.
2002/0156676 A1 10/2002 Ahrens et al.
2002/0161664 A1 10/2002 Shaya et al.
2002/0169747 A1 11/2002 Chapman et al.
2002/0173994 A1 11/2002 Ferguson, III
2002/0194120 A1 12/2002 Russell et al.

(56) References Cited

U.S. PATENT DOCUMENTS

2002/0198800 A1 12/2002 Shamrakov
2002/0198806 A1 12/2002 Blagg et al.
2002/0198824 A1 12/2002 Cook
2002/0198830 A1 12/2002 Randell et al.
2003/0002671 A1 1/2003 Inchalik et al.
2003/0007283 A1 1/2003 Ostwald et al.
2003/0009415 A1 1/2003 Lutnick et al.
2003/0009418 A1 1/2003 Green et al.
2003/0009426 A1 1/2003 Ruiz-Sanchez
2003/0018578 A1 1/2003 Schultz
2003/0023531 A1 1/2003 Fergusson
2003/0028466 A1 2/2003 Jenson et al.
2003/0028477 A1 2/2003 Stevenson et al.
2003/0046311 A1 3/2003 Baidya et al.
2003/0050929 A1 3/2003 Bookman et al.
2003/0061104 A1 3/2003 Thomson et al.
2003/0061163 A1 3/2003 Durfield
2003/0069839 A1 4/2003 Whittington et al.
2003/0069943 A1 4/2003 Bahrs et al.
2003/0097342 A1 5/2003 Whittingtom
2003/0097380 A1 5/2003 Mulhern et al.
2003/0105646 A1 6/2003 Siepser
2003/0105710 A1 6/2003 Barbara et al.
2003/0105733 A1 6/2003 Boreham
2003/0105742 A1 6/2003 Boreham et al.
2003/0115133 A1 6/2003 Bian
2003/0158960 A1 8/2003 Engberg
2003/0163435 A1 8/2003 Payone
2003/0163513 A1 8/2003 Schaeck et al.
2003/0163733 A1 8/2003 Barriga-Caceres et al.
2003/0171942 A1 9/2003 Gaito
2003/0187768 A1 10/2003 Ryan et al.
2003/0187837 A1 10/2003 Culliss
2003/0195859 A1 10/2003 Lawrence
2003/0204429 A1 10/2003 Botscheck et al.
2003/0204752 A1 10/2003 Garrison
2003/0208412 A1 11/2003 Hillestad et al.
2003/0220858 A1 11/2003 Lam et al.
2003/0225742 A1 12/2003 Tenner et al.
2003/0229580 A1 12/2003 Gass et al.
2004/0001565 A1* 1/2004 Jones .................. H04L 67/1095 375/354
2004/0006536 A1 1/2004 Kawashima et al.
2004/0010458 A1 1/2004 Friedman
2004/0015714 A1 1/2004 Abraham et al.
2004/0015715 A1 1/2004 Brown
2004/0019518 A1 1/2004 Abraham et al.
2004/0019549 A1 1/2004 Gulbrandsen
2004/0019799 A1 1/2004 Vering et al.
2004/0024671 A1 2/2004 Freund
2004/0024709 A1 2/2004 Yu et al.
2004/0030574 A1 2/2004 DiCostanzo et al.
2004/0030649 A1 2/2004 Nelson et al.
2004/0039586 A1 2/2004 Garvey et al.
2004/0044563 A1 3/2004 Stein
2004/0044601 A1* 3/2004 Kim .................. G06Q 30/0601 705/34
2004/0044628 A1 3/2004 Mathew et al.
2004/0044673 A1 3/2004 Brady et al.
2004/0046033 A1 3/2004 Kolodziej et al.
2004/0062213 A1 4/2004 Koss
2004/0083159 A1 4/2004 Crosby et al.
2004/0088237 A1 5/2004 Moenickheim et al.
2004/0088255 A1 5/2004 Zielke et al.
2004/0093278 A1 5/2004 Burchetta et al.
2004/0102197 A1 5/2004 Dietz
2004/0107250 A1 6/2004 Marciano
2004/0110119 A1 6/2004 Riconda et al.
2004/0111359 A1 6/2004 Hudock
2004/0117302 A1 6/2004 Weichert et al.
2004/0122681 A1 6/2004 Ruvolo et al.
2004/0122696 A1 6/2004 Beringer
2004/0122697 A1 6/2004 Becerra et al.
2004/0128150 A1 7/2004 Lundegren
2004/0128156 A1 7/2004 Beringer et al.
2004/0128215 A1 7/2004 Florance et al.
2004/0133440 A1 7/2004 Carolan et al.
2004/0133509 A1 7/2004 McCoy et al.
2004/0133513 A1 7/2004 McCoy et al.
2004/0133514 A1 7/2004 Zielke et al.
2004/0133515 A1 7/2004 McCoy et al.
2004/0138992 A1 7/2004 DeFrancesco et al.
2004/0138994 A1 7/2004 DeFrancesco et al.
2004/0138997 A1 7/2004 DeFrancesco et al.
2004/0141005 A1 7/2004 Banatwala et al.
2004/0143546 A1 7/2004 Wood et al.
2004/0143596 A1 7/2004 Sirkin
2004/0158723 A1 8/2004 Root
2004/0159700 A1 8/2004 Khan et al.
2004/0167793 A1 8/2004 Masuoka et al.
2004/0177035 A1 9/2004 Silva
2004/0186807 A1 9/2004 Nathans et al.
2004/0193538 A1 9/2004 Raines
2004/0193891 A1 9/2004 Ollila
2004/0199789 A1 10/2004 Shaw et al.
2004/0210661 A1 10/2004 Thompson
2004/0220865 A1 11/2004 Lozowski et al.
2004/0220918 A1 11/2004 Scriffignano et al.
2004/0225545 A1 11/2004 Turner et al.
2004/0225609 A1 11/2004 Greene
2004/0225643 A1 11/2004 Alpha et al.
2004/0230527 A1 11/2004 Hansen et al.
2004/0236688 A1 11/2004 Bozeman
2004/0243508 A1 12/2004 Samson et al.
2004/0243588 A1 12/2004 Tanner et al.
2004/0249811 A1 12/2004 Shostack
2004/0250107 A1 12/2004 Guo
2004/0254935 A1 12/2004 Chagoly et al.
2004/0255127 A1 12/2004 Arnouse
2004/0267714 A1 12/2004 Frid et al.
2005/0010513 A1 1/2005 Duckworth et al.
2005/0015273 A1 1/2005 Iyer
2005/0021476 A1 1/2005 Candella et al.
2005/0021551 A1 1/2005 Silva et al.
2005/0027632 A1 2/2005 Zeitoun et al.
2005/0027666 A1 2/2005 Beck et al.
2005/0027983 A1 2/2005 Klawon
2005/0050027 A1 3/2005 Yeh et al.
2005/0055231 A1 3/2005 Lee
2005/0055296 A1 3/2005 Hattersley et al.
2005/0058262 A1 3/2005 Timmins et al.
2005/0060332 A1 3/2005 Bernstein et al.
2005/0071328 A1 3/2005 Lawrence
2005/0080723 A1 4/2005 Burchetta et al.
2005/0080796 A1* 4/2005 Midgley ........... G06F 17/30067
2005/0086126 A1 4/2005 Patterson
2005/0091164 A1 4/2005 Varble
2005/0097017 A1 5/2005 Hanratty
2005/0097039 A1 5/2005 Kulcsar et al.
2005/0097320 A1 5/2005 Golan et al.
2005/0102180 A1 5/2005 Gailey et al.
2005/0105719 A1 5/2005 Hada
2005/0108396 A1 5/2005 Bittner
2005/0108631 A1 5/2005 Amorin et al.
2005/0114335 A1 5/2005 Wesinger, Jr. et al.
2005/0114344 A1 5/2005 Wesinger, Jr. et al.
2005/0114345 A1 5/2005 Wesinger, Jr. et al.
2005/0125291 A1 6/2005 Demkiw Grayson et al.
2005/0125397 A1 6/2005 Gross et al.
2005/0125686 A1 6/2005 Brandt
2005/0137899 A1 6/2005 Davies et al.
2005/0144452 A1 6/2005 Lynch et al.
2005/0154664 A1 7/2005 Guy et al.
2005/0154665 A1 7/2005 Kerr
2005/0154769 A1 7/2005 Eckart et al.
2005/0171884 A1 8/2005 Arnott
2005/0203768 A1 9/2005 Florance
2005/0208461 A1 9/2005 Krebs et al.
2005/0216434 A1 9/2005 Haveliwala et al.
2005/0216524 A1* 9/2005 Gomes .............. G06F 17/30578
2005/0216955 A1 9/2005 Wilkins et al.
2005/0226224 A1 10/2005 Lee et al.
2005/0240578 A1 10/2005 Biederman et al.
2005/0251474 A1 11/2005 Shinn et al.

(56) References Cited

U.S. PATENT DOCUMENTS

2005/0267840 A1 12/2005 Holm-Blagg et al.
2005/0273431 A1 12/2005 Abel et al.
2005/0288998 A1 12/2005 Verma et al.
2006/0004623 A1 1/2006 Jasti
2006/0004626 A1 1/2006 Holmen et al.
2006/0010391 A1 1/2006 Uemura et al.
2006/0031158 A1 2/2006 Orman
2006/0031177 A1 2/2006 Rule
2006/0032909 A1 2/2006 Seegar
2006/0036543 A1 2/2006 Blagg et al.
2006/0036748 A1 2/2006 Nusbaum et al.
2006/0041464 A1 2/2006 Powers et al.
2006/0041670 A1 2/2006 Musseleck et al.
2006/0059110 A1 3/2006 Madhok et al.
2006/0059362 A1 3/2006 Paden et al.
2006/0074986 A1 4/2006 Mallalieu et al.
2006/0074991 A1 4/2006 Lussier et al.
2006/0079211 A1 4/2006 Degraeve
2006/0080230 A1 4/2006 Freiberg
2006/0080251 A1 4/2006 Fried et al.
2006/0080263 A1 4/2006 Willis et al.
2006/0085334 A1 4/2006 Murphy
2006/0085361 A1 4/2006 Hoerle et al.
2006/0095289 A1 5/2006 Bunning
2006/0101508 A1 5/2006 Taylor
2006/0106670 A1 5/2006 Cai et al.
2006/0129419 A1 6/2006 Flaxer et al.
2006/0129481 A1 6/2006 Bhatt et al.
2006/0129533 A1 6/2006 Purvis
2006/0131390 A1 6/2006 Kim
2006/0136595 A1 6/2006 Satyavolu
2006/0155780 A1 7/2006 Sakairi et al.
2006/0161435 A1 7/2006 Atef et al.
2006/0161554 A1 7/2006 Lucovsky et al.
2006/0173776 A1 8/2006 Shalley et al.
2006/0173792 A1 8/2006 Glass
2006/0178971 A1 8/2006 Owen et al.
2006/0179050 A1 8/2006 Giang et al.
2006/0184585 A1 8/2006 Grear et al.
2006/0190394 A1 8/2006 Fraser et al.
2006/0195351 A1 8/2006 Bayburtian
2006/0200396 A1* 9/2006 Satterfield ............. G06Q 20/40 705/35
2006/0200583 A1* 9/2006 Le Lann ............. G06F 17/3089 709/249
2006/0202012 A1 9/2006 Grano et al.
2006/0212407 A1 9/2006 Lyon
2006/0218067 A1* 9/2006 Steele .................... G06Q 40/00 705/35
2006/0218407 A1 9/2006 Toms
2006/0223043 A1 10/2006 Dancy-Edwards et al.
2006/0229943 A1 10/2006 Mathias et al.
2006/0229961 A1 10/2006 Lyftogt et al.
2006/0235935 A1 10/2006 Ng
2006/0239512 A1 10/2006 Petrillo
2006/0253358 A1 11/2006 Delgrosso et al.
2006/0262929 A1 11/2006 Vatanen et al.
2006/0271456 A1 11/2006 Romain et al.
2006/0271457 A1 11/2006 Romain et al.
2006/0271633 A1 11/2006 Adler
2006/0277089 A1 12/2006 Hubbard et al.
2006/0282359 A1 12/2006 Nobili et al.
2006/0282373 A1 12/2006 Stone
2006/0282374 A1 12/2006 Stone
2006/0282429 A1 12/2006 Hernandez-Sherrington et al.
2006/0282819 A1 12/2006 Graham et al.
2006/0287764 A1 12/2006 Kraft
2006/0287765 A1 12/2006 Kraft
2006/0287766 A1 12/2006 Kraft
2006/0287767 A1 12/2006 Kraft
2006/0288090 A1 12/2006 Kraft
2006/0293987 A1 12/2006 Shapiro
2006/0294199 A1 12/2006 Bertholf
2007/0005508 A1 1/2007 Chiang
2007/0005984 A1 1/2007 Florencio et al.
2007/0016500 A1 1/2007 Chatterji et al.
2007/0022141 A1 1/2007 Singleton et al.
2007/0027816 A1 2/2007 Writer
2007/0032240 A1 2/2007 Finnegan et al.
2007/0038568 A1 2/2007 Greene et al.
2007/0040015 A1 2/2007 Carlson et al.
2007/0043577 A1* 2/2007 Kasower ................ G06Q 40/00 705/35
2007/0047714 A1 3/2007 Baniak et al.
2007/0055621 A1 3/2007 Tischler et al.
2007/0067297 A1 3/2007 Kublickis
2007/0072190 A1 3/2007 Aggarwal
2007/0073577 A1 3/2007 Krause et al.
2007/0073889 A1 3/2007 Morris
2007/0078908 A1 4/2007 Rohatgi et al.
2007/0078985 A1 4/2007 Shao et al.
2007/0083460 A1 4/2007 Bachenheimer
2007/0083463 A1 4/2007 Kraft
2007/0093234 A1 4/2007 Willis et al.
2007/0094230 A1 4/2007 Subramaniam et al.
2007/0094241 A1 4/2007 M. Blackwell et al.
2007/0112667 A1 5/2007 Rucker
2007/0112668 A1* 5/2007 Celano ................... G06Q 40/02 705/38
2007/0112670 A1 5/2007 DeFrancesco et al.
2007/0121843 A1 5/2007 Atazky et al.
2007/0124235 A1 5/2007 Chakraborty et al.
2007/0124256 A1 5/2007 Crooks et al.
2007/0136109 A1 6/2007 Yager et al.
2007/0143123 A1 6/2007 Goldberg et al.
2007/0156554 A1 7/2007 Nikoley et al.
2007/0156581 A1 7/2007 Imrey et al.
2007/0156692 A1 7/2007 Rosewarne
2007/0160458 A1 7/2007 Yen
2007/0174186 A1 7/2007 Hokland
2007/0174448 A1 7/2007 Ahuja et al.
2007/0174903 A1 7/2007 Greff
2007/0198432 A1 8/2007 Pitroda et al.
2007/0204338 A1 8/2007 Aiello et al.
2007/0205266 A1 9/2007 Carr et al.
2007/0208640 A1 9/2007 Banasiak et al.
2007/0220003 A1 9/2007 Chern et al.
2007/0226047 A1 9/2007 Ward
2007/0226122 A1 9/2007 Burrell et al.
2007/0233591 A1 10/2007 Newton
2007/0239493 A1 10/2007 Sweetland et al.
2007/0240206 A1 10/2007 Wu et al.
2007/0244807 A1 10/2007 Andringa et al.
2007/0245245 A1 10/2007 Blue et al.
2007/0250441 A1 10/2007 Paulsen et al.
2007/0262140 A1 11/2007 Long Sr.
2007/0266439 A1 11/2007 Kraft
2007/0273558 A1 11/2007 Smith
2007/0282743 A1 12/2007 Lovelett
2007/0288355 A1 12/2007 Roland et al.
2007/0288360 A1 12/2007 Seeklus
2007/0294195 A1 12/2007 Curry et al.
2007/0299770 A1 12/2007 Delinsky
2008/0010203 A1 1/2008 Grant
2008/0010206 A1 1/2008 Coleman
2008/0010687 A1 1/2008 Gonen et al.
2008/0021802 A1 1/2008 Pendleton
2008/0027859 A1 1/2008 Nathans et al.
2008/0028446 A1 1/2008 Burgoyne
2008/0033956 A1 2/2008 Saha et al.
2008/0040176 A1 2/2008 Ehling
2008/0040610 A1 2/2008 Fergusson
2008/0047017 A1 2/2008 Renaud
2008/0052182 A1 2/2008 Marshall
2008/0052244 A1 2/2008 Tsuei et al.
2008/0059352 A1 3/2008 Chandran
2008/0059364 A1 3/2008 Tidwell et al.
2008/0065569 A1 3/2008 Dutt et al.
2008/0065774 A1 3/2008 Keeler
2008/0066188 A1 3/2008 Kwak
2008/0071682 A1 3/2008 Dominguez
2008/0072316 A1 3/2008 Chang et al.
2008/0077526 A1 3/2008 Arumugam
2008/0082536 A1 4/2008 Schwabe et al.

(56) References Cited

U.S. PATENT DOCUMENTS

2008/0083021 A1 4/2008 Doane et al.
2008/0086400 A1 4/2008 Ardelean et al.
2008/0086431 A1 4/2008 Robinson et al.
2008/0091519 A1 4/2008 Foss
2008/0091530 A1 4/2008 Egnatios et al.
2008/0103800 A1 5/2008 Domenikos et al.
2008/0103972 A1 5/2008 Lanc
2008/0109422 A1 5/2008 Dedhia
2008/0109740 A1 5/2008 Prinsen et al.
2008/0110973 A1 5/2008 Nathans et al.
2008/0114670 A1 5/2008 Friesen
2008/0115226 A1 5/2008 Welingkar et al.
2008/0120155 A1 5/2008 Pliha
2008/0120204 A1 5/2008 Conner et al.
2008/0120569 A1 5/2008 Mann et al.
2008/0120716 A1 5/2008 Hall et al.
2008/0126233 A1 5/2008 Hogan
2008/0133278 A1 6/2008 Stanfield
2008/0140576 A1 6/2008 Lewis et al.
2008/0140734 A1* 6/2008 Wagner ............. G06F 17/30575
2008/0141346 A1 6/2008 Kay et al.
2008/0148368 A1 6/2008 Zurko et al.
2008/0154758 A1 6/2008 Schattmaier et al.
2008/0154766 A1 6/2008 Lewis et al.
2008/0162317 A1 7/2008 Banaugh et al.
2008/0162350 A1 7/2008 Allen-Rouman et al.
2008/0162383 A1 7/2008 Kraft
2008/0175360 A1 7/2008 Schwarz et al.
2008/0177655 A1 7/2008 Zalik
2008/0183480 A1 7/2008 Carlson et al.
2008/0183585 A1 7/2008 Vianello
2008/0195548 A1 8/2008 Chu et al.
2008/0201257 A1 8/2008 Lewis et al.
2008/0201401 A1 8/2008 Pugh et al.
2008/0208735 A1 8/2008 Balet et al.
2008/0212845 A1 9/2008 Lund
2008/0221972 A1 9/2008 Megdal et al.
2008/0222027 A1 9/2008 Megdal et al.
2008/0222706 A1 9/2008 Renaud et al.
2008/0228556 A1 9/2008 Megdal et al.
2008/0228775 A1 9/2008 Abhyanker et al.
2008/0229415 A1 9/2008 Kapoor et al.
2008/0249869 A1 10/2008 Angell et al.
2008/0255992 A1 10/2008 Lin
2008/0270209 A1 10/2008 Mauseth et al.
2008/0270294 A1 10/2008 Lent et al.
2008/0270295 A1 10/2008 Lent et al.
2008/0277465 A1 11/2008 Pletz et al.
2008/0281737 A1 11/2008 Fajardo
2008/0282324 A1 11/2008 Hoal
2008/0288283 A1 11/2008 Baldwin, Jr. et al.
2008/0288299 A1 11/2008 Schultz
2008/0294501 A1 11/2008 Rennich et al.
2008/0301016 A1 12/2008 Durvasula et al.
2008/0319889 A1 12/2008 Hammad
2009/0006230 A1 1/2009 Lyda et al.
2009/0024484 A1 1/2009 Walker et al.
2009/0030776 A1 1/2009 Walker et al.
2009/0037332 A1 2/2009 Cheung et al.
2009/0043691 A1 2/2009 Kasower
2009/0048957 A1 2/2009 Celano
2009/0055322 A1 2/2009 Bykov et al.
2009/0055404 A1* 2/2009 Heiden .................. G06Q 30/02
2009/0064297 A1 3/2009 Selgas et al.
2009/0089190 A1 4/2009 Girulat
2009/0089193 A1 4/2009 Paintin
2009/0094237 A1 4/2009 Churi et al.
2009/0100047 A1 4/2009 Jones et al.
2009/0106141 A1 4/2009 Becker
2009/0106150 A1 4/2009 Pelegero et al.
2009/0106846 A1 4/2009 Dupray et al.
2009/0119299 A1 5/2009 Rhodes
2009/0125369 A1 5/2009 Kloostra et al.
2009/0125972 A1 5/2009 Hinton et al.
2009/0126013 A1 5/2009 Atwood et al.
2009/0132347 A1 5/2009 Anderson et al.
2009/0157564 A1 6/2009 Cross
2009/0157693 A1 6/2009 Palahnuk
2009/0158030 A1 6/2009 Rasti
2009/0164380 A1 6/2009 Brown
2009/0171723 A1 7/2009 Jenkins
2009/0172788 A1 7/2009 Vedula et al.
2009/0172795 A1 7/2009 Ritari et al.
2009/0177529 A1 7/2009 Hadi
2009/0177562 A1 7/2009 Peace et al.
2009/0177670 A1 7/2009 Grenier et al.
2009/0183259 A1 7/2009 Rinek et al.
2009/0187607 A1* 7/2009 Yoo ..................... H04L 67/1095
2009/0198557 A1 8/2009 Wang et al.
2009/0198602 A1 8/2009 Wang et al.
2009/0199294 A1 8/2009 Schneider
2009/0204514 A1 8/2009 Bhogal et al.
2009/0204599 A1 8/2009 Morris et al.
2009/0210241 A1 8/2009 Calloway
2009/0210807 A1 8/2009 Xiao et al.
2009/0216640 A1 8/2009 Masi
2009/0217342 A1 8/2009 Nadler
2009/0228918 A1 9/2009 Rolff et al.
2009/0234665 A1 9/2009 Conkel
2009/0234775 A1 9/2009 Whitney et al.
2009/0234876 A1 9/2009 Schigel et al.
2009/0240624 A1 9/2009 James et al.
2009/0247122 A1 10/2009 Fitzgerald et al.
2009/0248573 A1 10/2009 Haggerty et al.
2009/0249451 A1 10/2009 Su et al.
2009/0254375 A1 10/2009 Martinez et al.
2009/0254476 A1 10/2009 Sharma et al.
2009/0254656 A1 10/2009 Vignisson et al.
2009/0254971 A1 10/2009 Herz et al.
2009/0260064 A1 10/2009 Mcdowell et al.
2009/0271265 A1 10/2009 Lay et al.
2009/0276368 A1 11/2009 Martin et al.
2009/0280467 A1 11/2009 Ahart
2009/0289110 A1 11/2009 Regen et al.
2009/0300066 A1 12/2009 Guo et al.
2009/0300604 A1* 12/2009 Barringer ............ G06F 11/3664 717/178
2009/0300641 A1* 12/2009 Friedman ............ G06F 11/3664 718/104
2009/0307778 A1 12/2009 Mardikar
2009/0313562 A1 12/2009 Appleyard et al.
2009/0327054 A1 12/2009 Yao et al.
2009/0327120 A1 12/2009 Eze et al.
2009/0327270 A1 12/2009 Teevan et al.
2010/0009320 A1 1/2010 Wilkelis
2010/0009332 A1 1/2010 Yaskin et al.
2010/0010935 A1 1/2010 Shelton
2010/0011428 A1 1/2010 Atwood et al.
2010/0023434 A1 1/2010 Bond
2010/0023440 A1 1/2010 Fraser et al.
2010/0023448 A1 1/2010 Eze
2010/0030578 A1 2/2010 Siddique et al.
2010/0030677 A1 2/2010 Melik-Aslanian et al.
2010/0036697 A1 2/2010 Kelnar
2010/0036769 A1* 2/2010 Winters ................. G06Q 20/10 705/40
2010/0042542 A1 2/2010 Rose et al.
2010/0043055 A1 2/2010 Baumgart
2010/0049803 A1 2/2010 Ogilvie et al.
2010/0063942 A1 3/2010 Arnott et al.
2010/0063993 A1 3/2010 Higgins et al.
2010/0077483 A1 3/2010 Stolfo et al.
2010/0082476 A1 4/2010 Bowman
2010/0083371 A1 4/2010 Bennetts et al.
2010/0094768 A1 4/2010 Miltonberger
2010/0094774 A1 4/2010 Jackowitz et al.
2010/0094910 A1 4/2010 Bayliss
2010/0100945 A1 4/2010 Ozzie et al.
2010/0114724 A1 5/2010 Ghosh et al.
2010/0114744 A1 5/2010 Gonen
2010/0114776 A1 5/2010 Weller et al.
2010/0122324 A1 5/2010 Welingkar et al.
2010/0122333 A1 5/2010 Noe et al.
2010/0130172 A1 5/2010 Vendrow et al.

(56) References Cited

U.S. PATENT DOCUMENTS

2010/0136956 A1 6/2010 Drachev et al.
2010/0145836 A1 6/2010 Baker et al.
2010/0153278 A1 6/2010 Farsedakis
2010/0153290 A1 6/2010 Duggan
2010/0161816 A1 6/2010 Kraft et al.
2010/0169159 A1 7/2010 Rose et al.
2010/0174813 A1 7/2010 Hildreth et al.
2010/0179906 A1 7/2010 Hawkes
2010/0185546 A1 7/2010 Pollard
2010/0188684 A1 7/2010 Kumara
2010/0205076 A1 8/2010 Parson et al.
2010/0205662 A1 8/2010 Ibrahim et al.
2010/0211445 A1 8/2010 Bodington
2010/0211636 A1 8/2010 Starkenburg et al.
2010/0217837 A1 8/2010 Ansari et al.
2010/0223160 A1* 9/2010 Brown ................ G06Q 20/102 705/26.1
2010/0223192 A1 9/2010 Levine et al.
2010/0228658 A1 9/2010 Ketelsen et al.
2010/0229245 A1 9/2010 Singhal
2010/0241535 A1 9/2010 Nightengale et al.
2010/0250338 A1 9/2010 Banerjee et al.
2010/0250410 A1 9/2010 Song et al.
2010/0250411 A1 9/2010 Ogrodski
2010/0250509 A1 9/2010 Andersen
2010/0253686 A1 10/2010 Alsbury et al.
2010/0257102 A1 10/2010 Perlman
2010/0257577 A1 10/2010 Grandison et al.
2010/0258623 A1 10/2010 Beemer et al.
2010/0262932 A1 10/2010 Pan
2010/0268557 A1 10/2010 Faith et al.
2010/0280914 A1 11/2010 Carlson
2010/0281020 A1 11/2010 Drubner
2010/0293090 A1 11/2010 Domenikos et al.
2010/0323446 A1 12/2010 Barnett et al.
2010/0325048 A1 12/2010 Carlson et al.
2010/0332393 A1 12/2010 Weller et al.
2011/0004498 A1 1/2011 Readshaw
2011/0023115 A1 1/2011 Wright
2011/0029388 A1 2/2011 Kendall et al.
2011/0035452 A1 2/2011 Gittleman
2011/0035788 A1 2/2011 White et al.
2011/0040629 A1 2/2011 Chiu et al.
2011/0066618 A1 3/2011 Sigurbjornsson et al.
2011/0071950 A1 3/2011 Ivanovic
2011/0078073 A1 3/2011 Annappindi et al.
2011/0083181 A1 4/2011 Nazarov
2011/0113084 A1 5/2011 Ramnani
2011/0113086 A1 5/2011 Long et al.
2011/0113096 A1 5/2011 Long et al.
2011/0125924 A1* 5/2011 McAleer ............ H04L 67/1095 709/248
2011/0126275 A1 5/2011 Anderson et al.
2011/0131123 A1 6/2011 Griffin et al.
2011/0137760 A1 6/2011 Rudie et al.
2011/0137765 A1 6/2011 Nonaka
2011/0142213 A1 6/2011 Baniak et al.
2011/0145899 A1 6/2011 Cao et al.
2011/0148625 A1 6/2011 Velusamy
2011/0166988 A1 7/2011 Coulter
2011/0167011 A1 7/2011 Paltenghe et al.
2011/0178841 A1 7/2011 Rane et al.
2011/0179139 A1 7/2011 Starkenburg et al.
2011/0184780 A1 7/2011 Alderson et al.
2011/0196791 A1 8/2011 Dominguez
2011/0211445 A1 9/2011 Chen
2011/0264566 A1 10/2011 Brown
2011/0264581 A1 10/2011 Clyne
2011/0270618 A1 11/2011 Banerjee et al.
2011/0270754 A1 11/2011 Kelly et al.
2011/0276396 A1 11/2011 Rathod
2011/0307397 A1 12/2011 Benmbarek
2011/0307434 A1 12/2011 Rostampour et al.
2011/0307957 A1 12/2011 Barcelo et al.
2012/0005070 A1 1/2012 McFall et al.
2012/0011158 A1 1/2012 Avner et al.
2012/0016948 A1 1/2012 Sinha
2012/0022990 A1 1/2012 Kasower
2012/0030216 A1 2/2012 Churi et al.
2012/0030771 A1 2/2012 Pierson et al.
2012/0047219 A1 2/2012 Feng et al.
2012/0054088 A1 3/2012 Edrington et al.
2012/0054592 A1 3/2012 Jaffe et al.
2012/0060105 A1 3/2012 Brown et al.
2012/0066106 A1 3/2012 Papadimitriou
2012/0072382 A1 3/2012 Pearson et al.
2012/0078932 A1 3/2012 Skurtovich, Jr. et al.
2012/0084866 A1 4/2012 Stolfo
2012/0089438 A1 4/2012 Tavares et al.
2012/0101938 A1 4/2012 Kasower
2012/0101939 A1 4/2012 Kasower
2012/0110467 A1 5/2012 Blake et al.
2012/0110677 A1 5/2012 Abendroth et al.
2012/0124498 A1 5/2012 Santoro et al.
2012/0136763 A1 5/2012 Megdal et al.
2012/0136774 A1 5/2012 Imrey et al.
2012/0151045 A1 6/2012 Anakata et al.
2012/0158654 A1 6/2012 Behren et al.
2012/0173339 A1 7/2012 Flynt et al.
2012/0173417 A1 7/2012 Lohman et al.
2012/0185515 A1* 7/2012 Ferrel ............... G06F 17/30557 707/802
2012/0198556 A1 8/2012 Patel et al.
2012/0215682 A1 8/2012 Lent et al.
2012/0215719 A1 8/2012 Verlander
2012/0216125 A1 8/2012 Pierce
2012/0235897 A1 9/2012 Hirota
2012/0239497 A1 9/2012 Nuzzi
2012/0246060 A1 9/2012 Conyack, Jr. et al.
2012/0253852 A1 10/2012 Pourfallah et al.
2012/0278767 A1 11/2012 Stibel et al.
2012/0290660 A1 11/2012 Rao et al.
2012/0297484 A1 11/2012 Srivastava
2012/0317014 A1 12/2012 Cerise et al.
2012/0324388 A1 12/2012 Rao et al.
2013/0006843 A1 1/2013 Tralvex
2013/0018811 A1 1/2013 Britti et al.
2013/0031109 A1 1/2013 Routson et al.
2013/0031624 A1 1/2013 Britti et al.
2013/0066775 A1 3/2013 Milam
2013/0080467 A1 3/2013 Carson et al.
2013/0085804 A1 4/2013 Leff et al.
2013/0103571 A1 4/2013 Chung et al.
2013/0110557 A1 5/2013 Kasower
2013/0110565 A1 5/2013 Means et al.
2013/0117072 A1 5/2013 Nish
2013/0117087 A1 5/2013 Coppinger
2013/0125010 A1 5/2013 Strandell
2013/0132151 A1 5/2013 Stibel et al.
2013/0173447 A1 7/2013 Rothschild
2013/0173449 A1 7/2013 Ng et al.
2013/0185293 A1 7/2013 Boback
2013/0205135 A1 8/2013 Lutz
2013/0211986 A1 8/2013 Debie et al.
2013/0267171 A1* 10/2013 Sarkar .................... G06Q 10/00 455/41.1
2013/0279676 A1 10/2013 Baniak et al.
2013/0293363 A1 11/2013 Plymouth
2013/0298238 A1 11/2013 Shah et al.
2013/0332341 A1 12/2013 Papadimitriou
2013/0332342 A1 12/2013 Kasower
2013/0339249 A1 12/2013 Weller et al.
2014/0012733 A1 1/2014 Vidal
2014/0012737 A1 1/2014 Evans
2014/0019348 A1 1/2014 Daley
2014/0032300 A1 1/2014 Zhang et al.
2014/0032723 A1 1/2014 Nema
2014/0046872 A1 2/2014 Arnott et al.
2014/0061302 A1 3/2014 Hammad
2014/0089166 A1* 3/2014 Padawer ................ G06Q 40/02 705/38
2014/0089167 A1 3/2014 Kasower
2014/0089191 A1* 3/2014 Brown .................. G06Q 20/12 705/44

(56) References Cited

U.S. PATENT DOCUMENTS

| | | | | |
|---|---|---|---|---|
| 2014/0096249 | A1 | 4/2014 | Dupont et al. | |
| 2014/0110477 | A1 | 4/2014 | Hammad | |
| 2014/0129942 | A1 | 5/2014 | Rathod | |
| 2014/0156500 | A1 | 6/2014 | Lassen et al. | |
| 2014/0156501 | A1 | 6/2014 | Howe | |
| 2014/0156503 | A1 | 6/2014 | Lassen et al. | |
| 2014/0164112 | A1 | 6/2014 | Kala | |
| 2014/0164398 | A1 | 6/2014 | Smith et al. | |
| 2014/0164519 | A1 | 6/2014 | Shah | |
| 2014/0180919 | A1* | 6/2014 | Brown | G06Q 20/1085 705/42 |
| 2014/0258083 | A1 | 9/2014 | Achanta et al. | |
| 2014/0258084 | A1* | 9/2014 | Padawer | G06Q 40/025 705/38 |
| 2014/0279329 | A1 | 9/2014 | Dancel | |
| 2014/0298485 | A1 | 10/2014 | Gardner | |
| 2014/0317023 | A1 | 10/2014 | Kim | |
| 2014/0379554 | A1* | 12/2014 | Grossman | G06Q 40/025 705/38 |
| 2015/0178829 | A1 | 6/2015 | Weiss | |
| 2015/0310543 | A1 | 10/2015 | Debie | |
| 2015/0324920 | A1 | 11/2015 | Wilson et al. | |
| 2015/0326580 | A1 | 11/2015 | McMillan et al. | |

FOREIGN PATENT DOCUMENTS

| | | |
|---|---|---|
| EP | 1 301 887 | 4/2003 |
| EP | 1 850 278 | 10/2007 |
| GB | 2 102 606 | 2/1983 |
| JP | 2005-208945 | 8/2005 |
| KR | 2000-0063313 | 11/2000 |
| KR | 2002-0039203 | 5/2002 |
| KR | 10-2007-0081504 | 8/2007 |
| WO | WO 91/16691 | 10/1991 |
| WO | WO 00/55778 | 9/2000 |
| WO | WO 01/09752 | 2/2001 |
| WO | WO 01/09792 | 2/2001 |
| WO | WO 01/84281 | 11/2001 |
| WO | WO 02/29636 | 4/2002 |
| WO | WO 2004/031986 | 4/2004 |
| WO | WO 2005/010683 | 2/2005 |
| WO | WO 2005/033979 | 4/2005 |
| WO | WO 2006/050278 | 5/2006 |
| WO | WO 2006/069199 | 6/2006 |
| WO | WO 2008/042614 | 4/2008 |
| WO | WO 2009/064694 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |

OTHER PUBLICATIONS

U.S. Appl. No. 12/705,511, filed Feb. 12, 2010, Bargoli et al.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.

ABC News Now:Money Matters, as broadcasted Nov. 15, 2005 with guest Todd Davis (CEO of Lifelock), pp. 6.

Anonymous, "Credit-Report Disputes Await Electronic Resolution," Credit Card News, Chicago, Jan. 15, 1993, vol. 5, No. 19, p. 5.

Anonymous, "MBNA Offers Resolution of Credit Card Disputes," Hempstead, Feb. 2002, vol. 68, No. 2, p. 47.

Anonymous, "Feedback", Credit Management, ABI/INFORM Global, Sep. 2006, pp. 6.

"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.

Bielski, Lauren, "Will you Spend to Thwart ID Theft?" ABA Banking Journal, Apr. 2005, pp. 54, 56-57, 60.

BlueCava, "What We Do", http://www.bluecava.com/what-we-do/, printed Nov. 5, 2012 in 3 pages.

Buxfer, http://www.buxfer.com/printed Feb. 5, 2014 in 1 page.

Check, http://check.me/ printed Feb. 5, 2014 in 3 pages.

Chores & Allowances, "Do Kids Have Credit Reports?" Oct. 15, 2007, http://choresandallowances.blogspot.com/2007/10/do-kids-have-credit-reports.html, pp. 5.

Comlounge.net, "plonesocial.auth.rpx" http://web.archive.org/web/20101026041841/http://comlounge.net/rpx as captured Oct. 26, 2010 in 9 pages.

CreditKarma, http://www.creditkarma.com printed Feb. 8, 2013 in 2 pages.

CreditSesame, http://www.creditsesame.com/how-it-works/our-technology/ printed Feb. 5, 2013 in 2 pages.

Collins, Michael J., "Exploring the Design of Financial Counseling for Mortgage Borrowers in Default," Journal of Family and Economic Issues, Springer Science+Business Media, Mar. 13, 2007, pp. 207-226.

"Consumers Gain Immediate and Full Access to Credit Score Used by Majority of U.S. Lenders", PR Newswire, ProQuest Copy, Mar. 19, 2001, p. 1.

"CreditCheck Monitoring Services," Dec. 11, 2000, pp. 1, lines 21-23.

"Credit Improvement", CreditRepair.com, Mar. 10, 2010, http://web.archive.org/web/20100310134914/http://www.creditrepair.com/credit/, as archived Mar. 10, 2010 in 2 pages.

Credit Plus, Inc., "Score Wizard", http://web.archive.org/web/20030806080310/www.creditplus.com/scorewizard.asp, as archived Aug. 6, 2003 in 1 page.

Cullen, Terri; "The Wall Street Journal Complete Identity Theft Guidebook:How to Protect Yourself from the Most Pervasive Crime in America"; Chapter 3, pp. 59-79; Jul. 10, 2007.

"D&B Corporate Family Linkage", D&B Internet Access for U.S. Contract Customers, https://www.dnb.com/ecomp/help/linkage.htm as printed Dec. 17, 2009, pp. 1.

"Data Loss Prevention (DLP) Software", http://www.symantec.com/data-loss-prevention/ printed Apr. 8, 2013 in 8 pages.

"Data Protection", http://compliantprocessing.com/data-protection/ printed Apr. 8, 2013 in 4 pages.

Day, Jo and Kevin; "ID-ology: A Planner's Guide to Identity Theft"; Journal of Financial Planning:Tech Talk; pp. 36-38; Sep. 2004.

"Debt Settlement: Watch Video on how to Pay Your Debt Faster", http://www.debtconsolidationcare.com/debt-settlement.html printed Jan. 9, 2013 in 6 pages.

Demby, Elayne, "Special Report: Letting Consumers Know the Score—and More", Collections and Credit Risk, New York, Feb. 2003, vol. 8, Issue 2, p. 53, pp. 3.

Elliehausen et al., The Impact of Credit Counseling on Subsequent Borrower Behavior, The Journal of Consumer Affairs, Summer 2007, vol. 41, No. 1, pp. 1-28.

Equifax Consumer Credit Report http://www.equifax.com/home/, as retrieved on Sep. 17, 2008.

Equifax; "Equifax Credit Watch"; https://www.econsumer.equifax.co.uk/consumer/uk/sitepage.ehtml, dated Jun. 27, 2007 on www.archive.org.

"Equifax: Debt Wise™ Credit Monitoring Service," Product Review, http://www.mdmproofing.com/iym/reviews/equifax/debt-wise/, Jan. 2010, pp. 11.

Equifax; "Places", http://web.archive.org/web/20111111113930/http://www.equifax.com/places as archived Nov. 11, 2011 in 1 page.

(56) References Cited

OTHER PUBLICATIONS

Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx asarchived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobil Address Management and Billing for Personal Communications", 1st International Conference on Universal Personal Communications, 1992, ICUPC '92 Proceedings, pp. 253-257.
"Fictitious Business Name Records", Westlaw Database Directory, http://directoy.westlaw.com/scope/default.asp?db=FBN-ALL&RS-W&VR=2.0 as printed Dec. 17, 2009, pp. 5.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
IDEON, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.
"Judging Credit: Consumers Need Better Finance Tools", News Journal, Daytona Beach, FL, Dec. 28, 2002.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A.; "Experian, on Deal Hunt, Nets Identity Theft Insurer", American Banker: The Financial Services Daily, Jun. 4, 2003, New York, NY, 1 page.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, Various Pages, www.lifelock.com/, 2007.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Lund, Graham, "Credit Bureau Data: Maximizing the Benefits," Credit Management, May 2004, ProQuest Central, pp. 44-45.

(56) References Cited

OTHER PUBLICATIONS

Magid, Lawrence, J., Business Tools: When Selecting an ASP Ensure Data Mobility, Los Angeles Times, Los Angeles, CA, Feb. 26, 2001, vol. C, Issue 4, pp. 3.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directoy.westlaw.com/scope/default.asp?db=NA-ALL&RS=W&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/accessed on Oct. 13, 2011.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts-com/dated Jan. 12, 2011 printed Oct. 16, 2012 in 3 pages.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Planwise, http://planwise.com printed Feb. 8, 2013 in 5 pages.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/aet/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
Shin, Laura, "See an Error on Your Credit Report? Credit Karma Now Makes It Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.

(56) References Cited

OTHER PUBLICATIONS

Stauffer et al., "Using HTML 3.2," Second Edition, 1996, Que Publishing, pp. 192-193.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wesabe.com http://www.wesabe.com/, as retrieved on Sep. 17, 2008.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Application as filed in U.S. Appl. No. 09/411,683, dated Oct. 4, 1999.
Awoonor-Williams, Princess Josephine, Ph.D. "Gender and Credit: An Analysis of Women's Experience in the Credit Market", ProQuest Dissertations and Theses, 2004, pp. 148.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.

* cited by examiner http://www.example.com/

PROFILE FOR JOHN DOE (Edit Name)

Personal Information (Add/Edit)

| | | |
|---|---|---|
| Address: | 123 Center St | Enter new Address |
| | Santa Ana, CA | Enter new Address |
| Phone: | (949) 000-0000 | Enter new Phone |
| Email: | JohnDoe@email | JD123@email.com |
| Marital Status: | Married | Enter new Marital Status |
| Deceased | N | Enter new Deceased Status |

Submit Reset

FIGURE 2

SYSTEMS AND USER INTERFACES FOR DYNAMIC ACCESS OF MULTIPLE REMOTE DATABASES AND SYNCHRONIZATION OF DATA BASED ON USER RULES

CROSS-REFERENCE TO RELATED APPLICATIONS

This application claims priority benefit under 35 U.S.C. §119(e) of U.S. Provisional Application No. 61/906,786, filed on Nov. 20, 2013, the disclosure of which is hereby incorporated by reference herein in its entirety.

TECHNICAL FIELD

Embodiments of present disclosure relate to systems and techniques for dynamic interactions with user information.

BACKGROUND

Generally, user computing devices and computing systems may facilitate the management of a user's personal data. For example, the user may have information stored in a plurality of remote databases, such as those used by various social networking sites, elastic on-demand storage systems (for example, cloud computing systems), or remote file sharing services, as well as the user's own personal computer or mobile device to store personal data and/or personal information. The user's use of the Internet may result in a wide distribution of the user's personal information to many different computing systems, devices, and other users. For example, social networking sites, online retailers, and/or blogs may contain personal information about the user.

Generally, when a user wishes to update profile information (e.g., address, phone number, etc.), for example, at a social networking site, credit monitoring service, blog, and/or other online service, the user will manually update the information at each of the sites, by logging into multiple sites and providing information for storage in the relevant databases of the multiple sites. Thus, if a user changes phone numbers, he may need to visit multiple websites and navigate to the profile change sections in each in order to make the same change to the phone number on the multiple sites. These tasks become redundant and, accordingly, the user may not make changes to all accounts. Additionally, such manual changes increase the risk of errors (e.g., typos) in the updated information provides to different entities.

SUMMARY

The systems, methods, and devices described herein each have several aspects, no single one of which is solely responsible for its desirable attributes. Without limiting the scope of this disclosure, several non-limiting features will now be described briefly.

Disclosed herein are systems and methods that automatically identify updated information associated with a user in one or more remote databases (e.g., databases associated with online web services) and determine updates to me made to other remote databases based on user rules for providing such automatic updates. Thus, the systems and methods disclosed herein may allow a user to update profile information of the user at not just a single website or entity, but with multiple entities, without requiring the user to communicate with each of the entities individually. In some embodiments, the methods disclosed herein are performed by a profile update system that has existing relationships and/or communication channels with multiple entities, such as financial institutions, government institutions, retail companies, and websites, for example. Accordingly, the profile update system may advantageously push any updates to the user's profile information to multiple entities with which the user has a relationship (e.g., an account) in order to implement such profile updates across the multiple entities. Such updates may be implemented, for example, via an application programming interface (API) that the plurality of remote database (also referred to generally as "partners" or "entities" herein) have access to. For example, a change to a user's information in a first remote database may be determined via access to the first remote database through an API, and changes in the user's information that are identified may be pushed to one or more other remote databases via the API.

The term "database," as used herein, may refer to an database (e.g., RDBMS or SQL database), or may refer to any other data structure, such as, for example a comma separated values (CSV), eXtendible markup language (XML), TeXT (TXT) file, flat file, spreadsheet file, and/or any other widely used or proprietary format. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In some embodiments, a profile update system includes an update status module that communicates with remote databases to which updates were provided in order to track if/when the updates are implemented within those remote databases. The status of the updates may they then be provided to the user, such that the user can intervene in making updates if necessary (e.g., if a remote database associated with a particular user account is not recognizing an address update that the user wants to ensure is correct). Additionally, an update status user interface may include an option for re-requesting updates to the user's information, such as at the request of the user interfacing with the update status user interface, and/or may automatically re-request the profile information be updated at one or more remote databases at which the updates are not implemented within a predetermined time period.

In one embodiment, a computing system is configured to access a plurality of remote databases in order to identify data inconsistencies between the remote databases and provide user interfaces to a user in order to initiate communication via one or more APIs to certain remote databases indicating updates that reconcile said data inconsistencies. The computing system may include one or more storage devices configured to store electronic software instructions and one or more computer processors in communication with the storage device. The one or more computer processors may be configured to execute the stored software instructions to cause the computing system to automatically access first user information stored in one or more storage devices, the first user information including indications of each of a plurality of remote databases having data regarding a first user, the first user information including a plurality of first data fields and a corresponding plurality of first data values associated with respective first data fields, wherein at least some of the plurality of remote databases include matching first data values in particular first data fields, access a first remote database of the plurality of remote databases via one or more network connections and an application programming interface in communication with the first remote database, determine first remote data associated with the first user stored in the first remote database, compare the first remote data to the first user information by comparing each of a plurality of first data values in the first user information to corresponding remote data values of associated data fields in the first remote data, identify a particular first data value that does not match a corresponding remote data value for an associated data field, generate an interactive user interface for transmission to a remote user computing device, the interactive user interface including authentication prompts usable to authenticate an identity of the first user, receive input from the remote user computing device, and compare the input from the remote computing device to expected authentication information from the first user. In one embodiment, in response to determining that the expected authentication information from the first user matches the input from the remote computing device, authenticating the first user and: generate a second user interface for transmission to the remote user computing device, the second user interface including, the particular first data value, the corresponding remote data value, and an interactive user interface control usable by the first user to instruct the computing system to update the particular first data value in the first user information with the corresponding remote data value from the first remote data. In one embodiment, in response to receiving an indication via the second user interface that the first user selected the user interface control, replacing the particular first data value in the first user information with the corresponding remote data value from the first remote data, identifying a subset of the plurality of remote databases that each do not include the corresponding remote data value, generate a third user interface for transmission to the remote user computing device, the third user interface including an indication of at least some of the subset of remote databases and interactive user interface controls usable to select one or more of the subset of remote databases. In one embodiment, in response to receiving an indication of a selected one or more of the first subset of remote databases from the remote user computing device: determine access protocols for each of the selected one or more remote databases; and using the determined access protocols for respective of the selected one or more remote databases, transmitting the corresponding remote data value to each of the selected one or more remote databases in order to initiate updates at each of the selected one or more remote databases.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2 illustrates an example interactive user interface that may be interacted with by a user in order to provide updates to profile information.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Example Interactive User Interfaces

FIG. 1 illustrates an example user interface including user profile information 170 for an example user John Doe. In this example, the profile information 170 includes personal information, family information, professional information, and login information for a plurality of remote databases, such as websites or other secure data sources. As discussed further below, the user may maintain this profile as a master profile that, when updated, causes changes to be pushed to multiple entities, without further input from the user. The user profile may be generated in any manner, such as by the user entering the profile information, by crowdsourcing the user profile information, such as is disclosed in co-pending application Ser. No. 13/794,459, filed on Mar. 11, 2013, or via other profile building functionalities, such as those discussed in co-pending application Ser. No. 13/779,492, filed on Feb. 27, 2013, each of which is incorporated by reference in its entirety and for all purposes.

Figure 1A:
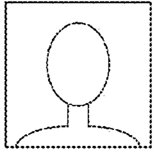
FIG. 1A illustrates an example interactive user interface including user profile information for an example user John Doe.
Figure 1B:
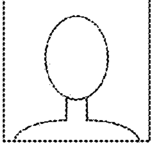
FIG. 1B illustrates an example interactive user interface including user profile information for an example user John Doe, and including login credentials for groups of sites.

FIG. 1B illustrates an example interactive user interface including user profile information 172 for an example user John Doe. In this example, the database access credentials (e.g., usernames and passwords in this example) are categorized not by specific remote databases, but rather by categories of information that are maintained and accessible at those remote databases. In this particular example, a first username and password is usable at each of six different remote databases that provide "News/Sports Sites". Similarly, a different username and password are usable at two remote databases that provide "Family" information to the user. Thus, as explained further below, the profile update system may access remote databases using access credentials that are shared among different types or categories of remote databases. Additionally, such categories may be usable by the profile update system to automatically determine which of a plurality of remote databases should be updated with new user profile information. For example, a first update to a user's profile information (e.g., that may be provided by the user himself or that may be automatically detected at a remote database) may be provided to a first category of remote databases (e.g. to all of the "News/Sports Sites"), while a second update to the user's profile information may be provided to a second category of remote databases, but not the first category of remote databases. Such selective updating of user profile information to different remote databases may be based on update rules provided by the user or may be determined based on input from a user at the time an update to profile information is provided by the user or detected by the profile update system.

Figure 1C:
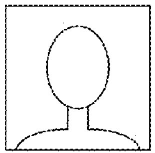
FIG. 1C illustrates an example interactive user interface including secondary user profile information for the example user John Doe.

FIG. 1C illustrates an example interactive user interface including secondary user profile information 174 for an example user John Doe. In this embodiment, the user has created a secondary profile that includes some differences in profile information than in the user's primary profile (e.g. the profiles illustrated in FIGS. 1A and 1B may be considered primary profiles). In some embodiments, a user may have different profile information that they would like to share with different remote databases and/or categories of remote databases. In the example of FIG. 1C, the secondary profile for John Doe includes Personal Information that is different than the Personal Information in the user's primary profile and does not include certain categories of information that are included in the user's primary profile. In one embodiment, the user can select which profile (e.g., a primary, secondary, tertiary, etc.) that the user would like to provide to selected remote databases or categories of remote databases. For example, the user may wish to provide the secondary profile to technical websites and databases, while providing the primary profile to other types of websites and/or databases. Depending on the embodiment, categorization of partners may be performed automatically by the profile update system (e.g., based on categorization provided by other users and/or keyword analysis that is automatically performed by the profile update system).

FIG. 2 illustrates an example user interface that may be displayed to a user in response to selecting the edit button with reference to the personal information section of information illustrated in FIG. 1A. As shown in FIG. 2, the user is offered the opportunity to update any of the personal information items by entering new/updated information in the text entry boxes. In other embodiments, information may be added and/or at edited in any other manner, such as using other user interface controls. In one embodiment, if the user makes changes to the profile data (e.g., by entering a new phone number in the text entry field), and then selects the submit button, the new phone number will be pushed out to each of multiple remote databases by the profile update system. In the embodiment of FIG. 2, the user has typed in a new email address (JD123@email.com). In some embodiments, the entities to which the updates are provided are automatically determined by the profile update system, such as based on information obtained from various data sources, including credit data, social network data, financial data, etc., that may be obtained from one or more data sources regarding the user. In some embodiments, the user may provide a list of remote databases for which data should be updated in response to changes to profile data. For example, with reference to FIG. 1 the user has provided login and password information for 3 websites. In one embodiment the user may select which of the 3 websites (or all 3 websites) that should receive updated profile information in response to updates to the profile information (e.g., using the user interface of FIG. 2).

Figure 3:
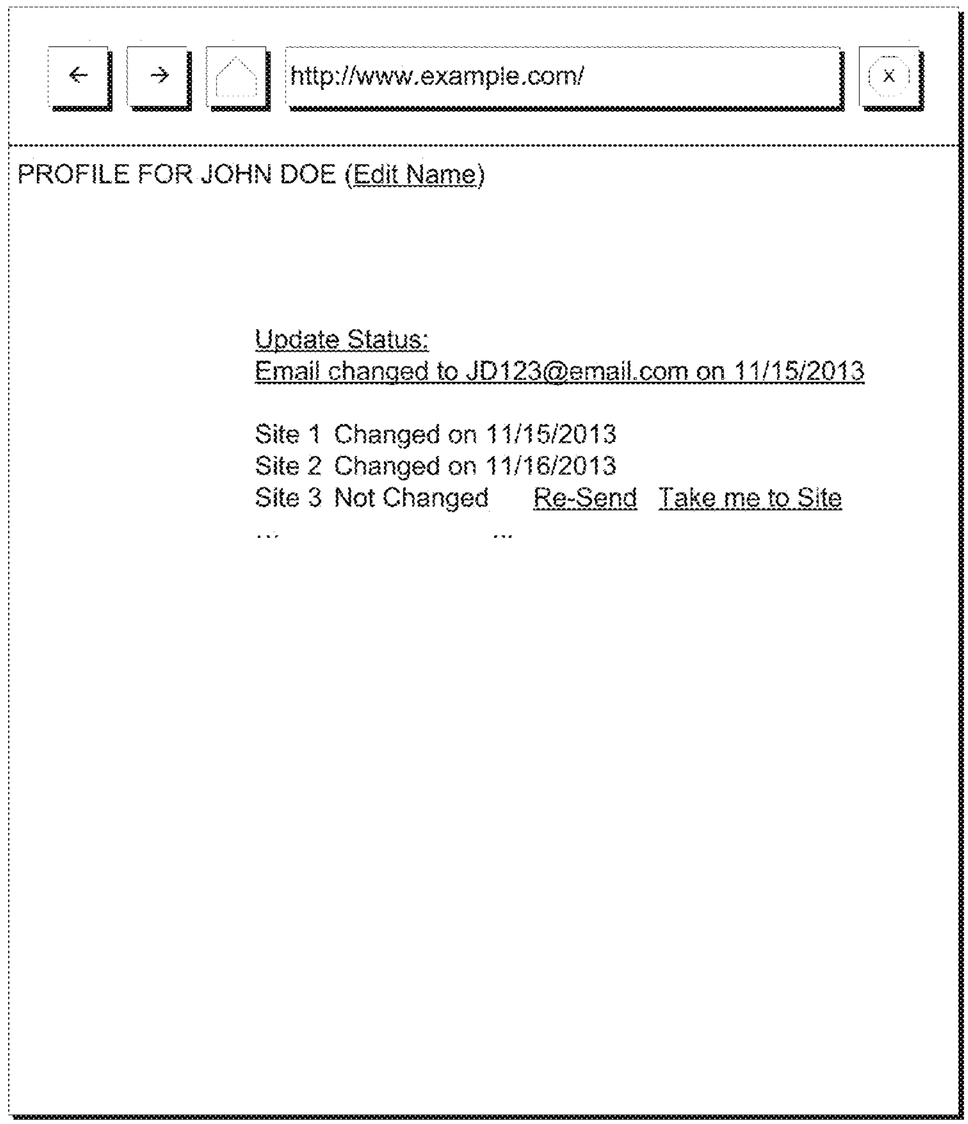
FIG. 3 illustrates an example interactive user interface that may be provided to the user in order to indicate changes to the user's profile that have been implemented (or not implemented) in various remote databases.

Once the updates have been pushed to the various remote databases, the profile update system may track status of the updates at each of the (or at least some of the) remote databases and provide updates to the user. FIG. 3 is one example user interface that may be provided to the user in order to indicate changes to the user's profile that have been implemented (or not implemented) in various remote databases. In this example, the update status for John Doe's email change (illustrated in FIG. 2) is provided for each of three remote databases (websites in this example) to which the user requested the email address change be pushed. As noted above, the user may push updates to profile information to any number of entities (not limited to only websites), which may be automatically determined by the profile update system and/or provided by the user.

In the example of FIG. 3, the update status indicates that site 1 and site 2 (e.g., two different remote databases associated with partner websites) changed the email address for John Doe in response to the update request from the profile update system on November 15 and November 16, respectively. The status update also indicates that site 3 had not yet changed the email address for John Doe. In this embodiment, John Doe has the option of selecting a link to initiate resending of the updated email address request to site 3 by selecting the "re-send" link. In one embodiment, resending the updated email address causes the profile update system to transmit the profile update in the same manner as was previously provided to site 3. In other embodiments, resending the updated profile information is performed in a different manner. The user also has the option of selecting the "take me to site" link in order to be redirected to site 3, and possibly to the update profile section of site 3, so that the user can manually update the email address with site 3.

Figure 4:
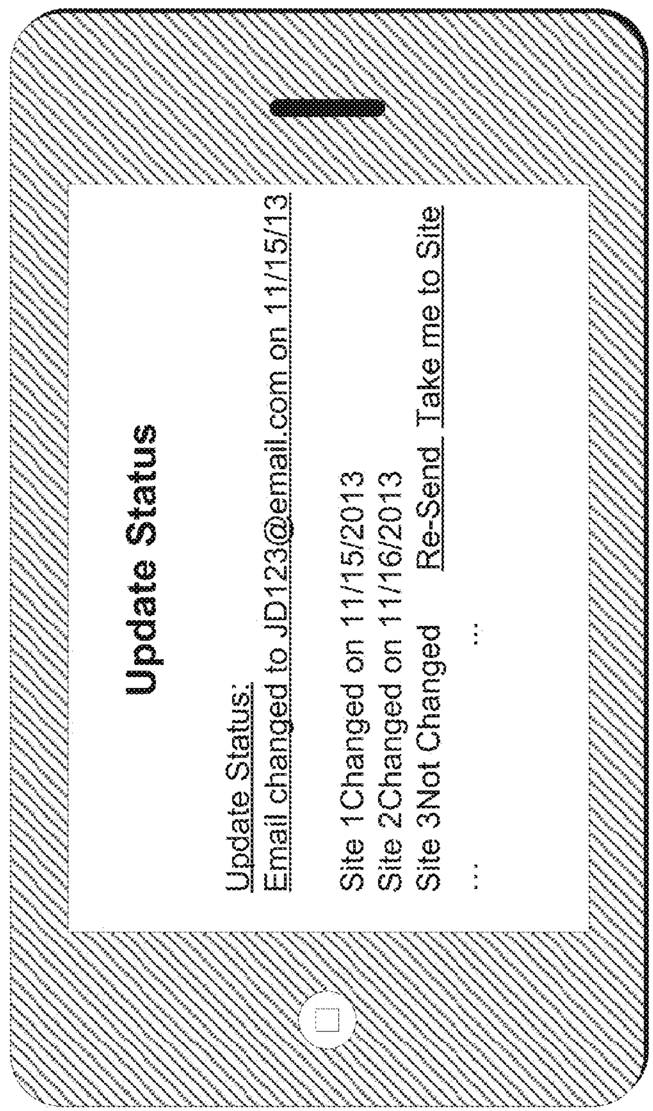
FIG. 4 illustrates an example interactive user interface that may be displayed on a mobile device providing similar update status information as that in FIG. 3.

FIG. 4 is an example user interface that may be displayed on a mobile device providing similar update status information as that in FIG. 3, with similar options to allow the user to initiate resending of the update request to a particular site and/or be redirected to the site.

Example Workflow for Updating Remote Databases

Figure 5A:
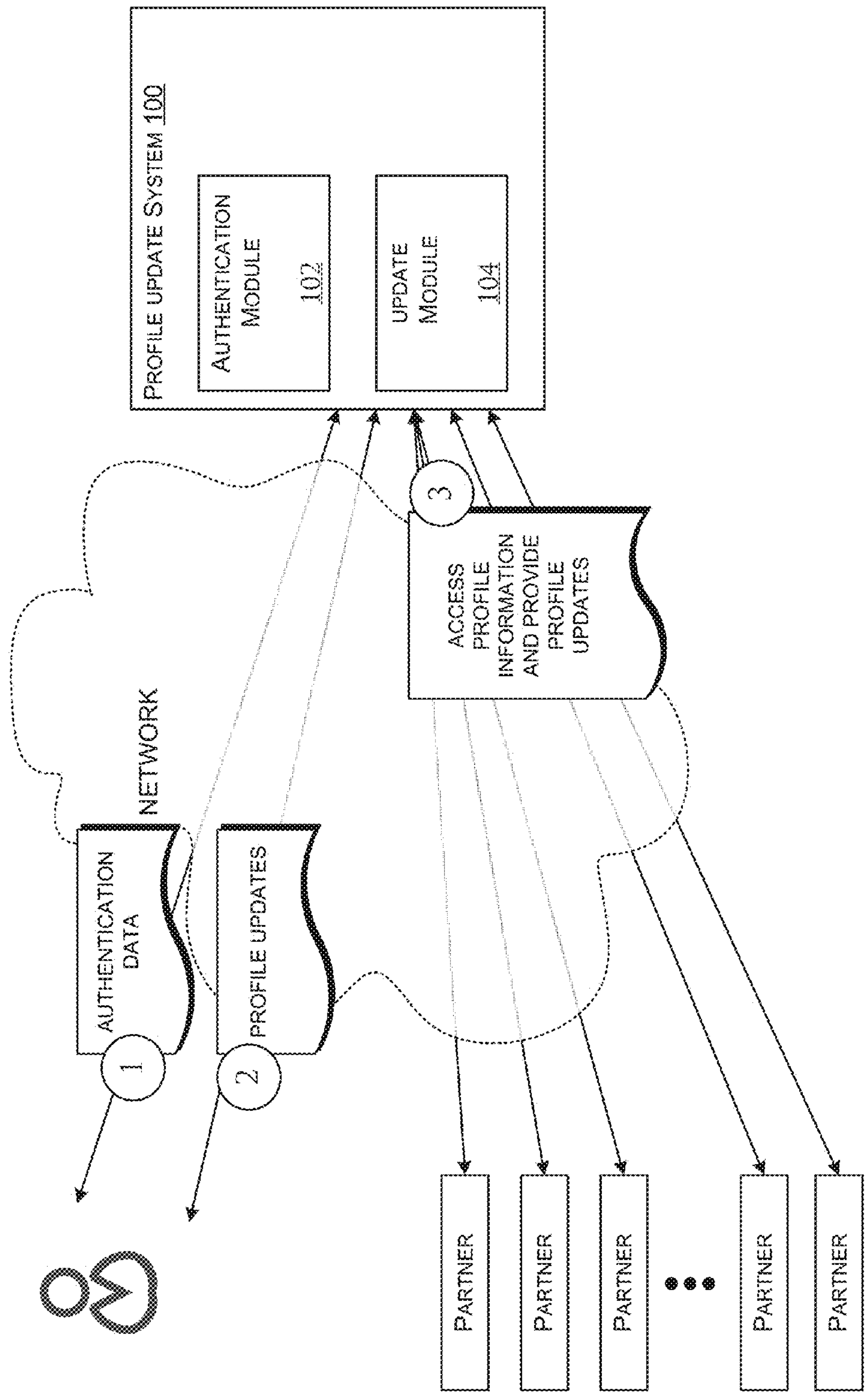
FIG. 5A is a flow diagram illustrating an example workflow for the profile update system authenticating a user, identifying updates to profile information of the user (or receiving profile updates from the user), and providing updated information to a plurality of partners.

FIG. 5A is a flow diagram illustrating an example workflow for the profile update system in authenticating a user, identifying updates to profile information of the user (or receiving profile updates from the user), and providing updated information to a plurality of partners. In the embodiment of FIG. 5A, the Profile Update System 100 may be controlled by any entity that has associations with multiple other entities to which profile update changes will likely need to be provided. Having such preexisting links with these entities makes it easier for the user to provide updated information to multiple entities, which the user may not even have an online account established with. A profile update application used by the user may be provided by the same entity that controls the profile update system 100. For example, the profile update app may be a downloadable application that can be installed on a mobile or desktop computer of the user and/or a browser viewable application that the user can interface with via a web browser.

In the embodiment of FIG. 5A, at a first action (indicated by the circled numeral "1"), the user is authenticated in order to confirm that that user is who they really say they are, and to reduce the risk of fraud in the profile update system pushing profile changes to accounts that are not authorized by the user (e.g., changes that are provided by a fraudster impersonating the user). In this embodiment, an authentication module 102 of the profile update system 100 initiates the authentication process, which may be a process that is carried out entirely by the profile update system 100 or which may include actions by a third-party, such as an authentication provider. Depending on the embodiment, the authentication may take various forms. For example, in one embodiment authentication may be based on "knowledge-based" questions that are asked of the user, wherein the questions are formed in such a way that only the particular user should know the answers. In one embodiment, authentication questions are asked based on information regarding the user located in credit data of the user. Such "out of wallet" questions are configured to solicit responses that include information highly likely to only be known by the user (and/or unlikely to be known by a fraudster), such as a monthly payment amount on an outstanding debt obligation which may appear on the user's credit report, the name or address of a particular loan servicer, the date that the last payment was posted to a credit account, and so on.

Once the user is authenticated (e.g., the user of the remote computing device provides answers to authentication questions, or other authentication information, indicating that the user really is the individual identified in the profile information), the user is given an opportunity to provide profile updates (action 2 of FIG. 5A). In this embodiment, an update module 104 interfaces with the user in order to receive profile updates from the user. As discussed below with reference to FIG. 5B, the update module 104 may also detect changes to the user's profile information at various remote databases and/or determine which other remote databases the detected profile update should be provided to.

In the example of FIG. 5A, the user desires to make a change to profile data that is relevant to profile data stored with multiple data sources/entities. As discussed above, in some embodiments the user may have a master profile stored with a particular service, such as a database maintained by the profile update system, and may make changes to that master profile in order to trigger pushing of changes to multiple remote databases. In other embodiments, the user may log into a website (or call a number associated with) the profile update system in order to initiate the process of pushing changes to the user's profile to multiple remote databases. In this embodiment, the user may not need to provide the full profile information, but rather may provide only the profile information that is to be changed (as well as any other information needed for authentication or other procedures performed by the profile update entity), such as an updated email address or telephone number.

In some circumstances, the user may be required to provide proof of the profile information change, such as by submitting a marriage certificate, death certificate, change of address verification, etc., in order for the profile update system to push the requested profile update to certain entities. For example, certain governmental institutions may require such proof of change before making profile updates regarding the user. Thus, depending on embodiment, the profile update system may forward the proof of change information to one or more entities and/or the entities may rely on the indication from the profile update system that the proof of change information was received and accurately indicated the requested profile update. In some embodiments, a third party that specializes in authenticating such information may be consulted by the profile update system 100 in order to determine whether the updates to the user's profile are legitimate.

At action 3 of FIG. 5A, the profile update system 100 pushes the indicated update to a plurality of remote databases of partners, such as financial institutions, governmental institutions, retail companies, and non-commerce companies, such as websites and social media applications. In other embodiments, any other entity may be included as a recipient of profile updates of the user.

The profile update system may then monitor the status of updates at the various entities, such as by accessing the website of those entities periodically in order to determine whether the requested profile updates have been made. As discussed above with reference to the FIGS. 3 and 4, for example, the user may be provided with various user interfaces indicating the status of profile updates and may be offered options for following up with partners that have not yet made the requested profile updates.

Depending on the embodiment, the user profile information may include various information about the user including, for example, the user's name, gender, age, ethnicity, handicaps, address, contact information, photo, employer, education, interests, and any other data associated with the user.

Figure 5B:
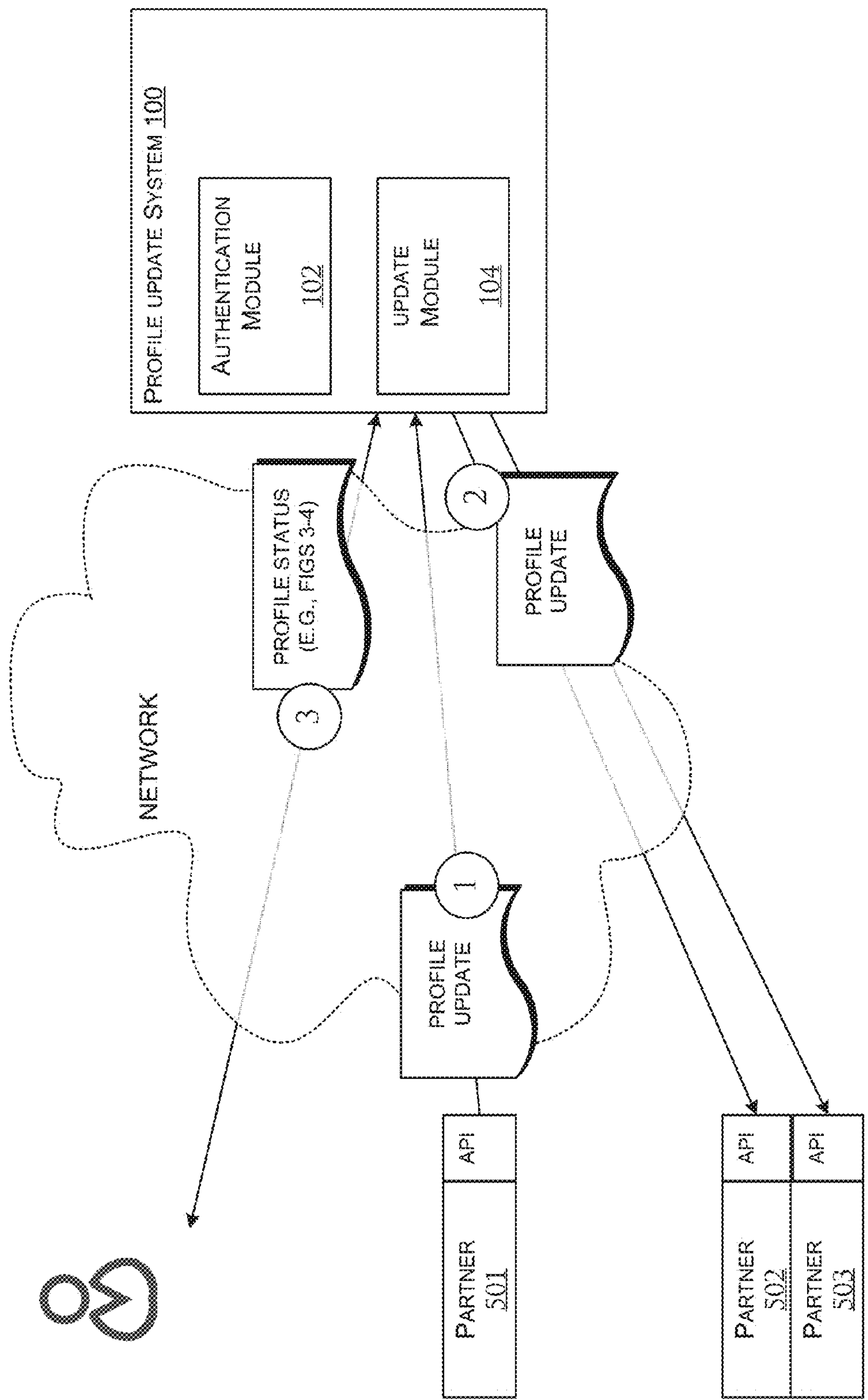
FIG. 5B is a flow diagram illustrating an example workflow for the profile update system accessing profile information via an API at a partner and then providing detected updates in the profile information to two other partners via an API.

FIG. 5B is a flow diagram illustrating an example workflow for the profile update system 100 accessing profile information via an API at a partner 501 and then providing detected updates in the profile information to two other partners 502, 503 via an API. Beginning at action 1 in FIG. 5B, the profile update system 100 accesses user information at the partner 501 via an API, such as an API that is provided by the profile update system 100 and allows bidirectional communication between the partner 501 and the profile update system 100. Depending on the embodiment, various security protocols may be implemented in order to prevent unauthorized access to partners view the API. Use of any such currently available and/or later developed technologies or protocols are contemplated.

In other embodiments, other communication protocols and methods may be used in order for the profile update system 100 to obtain user information from the partner 501. For example, the profile update system 100 may query the partner 501 database periodically in order to access information from users that are registered with the profile update system 100, e.g., using login credentials provided by respective users. The profile update system 100 may then compare profile data for respective users from the partner 501 with profile data for the users stored at the profile update system 100 and/or profile information of the user at other partners, such as partners 502, 503.

At action 2 of FIG. 5B, the profile update system 100, such as the update module 104, determines if any updates to the user profile information should be pushed to any remote third-party databases. In one embodiment, the user establishes rules that are usable by the profile update system 100 in order to automatically determine which third-party databases should be updated with new profile information discovered at one or more partners. For example, rules may indicate that certain types or categories of information that are identified as new or changed information at certain specific or groups of remote databases (e.g., trusted databases) are automatically pushed to all other remote databases that require the update (e.g. all that have different information for the updated data field of the user). In other embodiments, the user is provided information on updates to the user's profile that are identified at partner 501 and provided an opportunity to indicate which of a plurality of other partners (e.g., partners 502, 503) to which the detected update should be provided. In one embodiment, the user is provided with a list of other partners that have different information in the updated data fields of the user's profile. The user may then select which of the remote databases to update with the identified profile information. Thus, in one embodiment the user can update profile information across multiple remote databases by updating profile information at a particular site so that the profile update system 100 automatically detects that update and initiates provision of the update to other remote databases. Accordingly, the user may not even need to access a website provided by the profile update system 100 in order to initiate changes to multiple remote databases having profile information of the user. The profile update system 100 may then push the detected profile update to partners 502, 503 via the API (or other communication technology). As noted above, in some embodiments rather than use of an API to access the user profile, the user provides authentication credentials (e.g., login and password) that are usable by the profile update system 100 to login to the users account and automatically update the user's profile information.

In one example embodiment, the user provides a profile update to a first partner 501 and the profile update system 100 automatically detects the update. The detected profile update may then be pushed to the user, such as via an application executing on the user's mobile device or a text message sent to the user's mobile device, with a request to authorize pushing of the detected update to all or some of the other remote databases that store profile information of these user (whether the remote databases are indicated by the user or are automatically detected by the profile update system 100, such as based on scanning of user profile databases of multiple partners, in order to identify remote databases having profile information for respective users). Thus, the user may be able to update profile information at any of multiple remote databases (e.g. of various websites or online services) in order to initiate and easily implement updates of those same profile updates to multiple remote databases.

At action 3 of FIG. 5B, a user interface (including graphical user interfaces, information provided to an application installed on a user device, text messages, etc.) may be provided to the user indicating status of profile updates at one or more remote databases to which the detected profile update has been pushed.

Example System Implementation and Architecture

Figure 6:
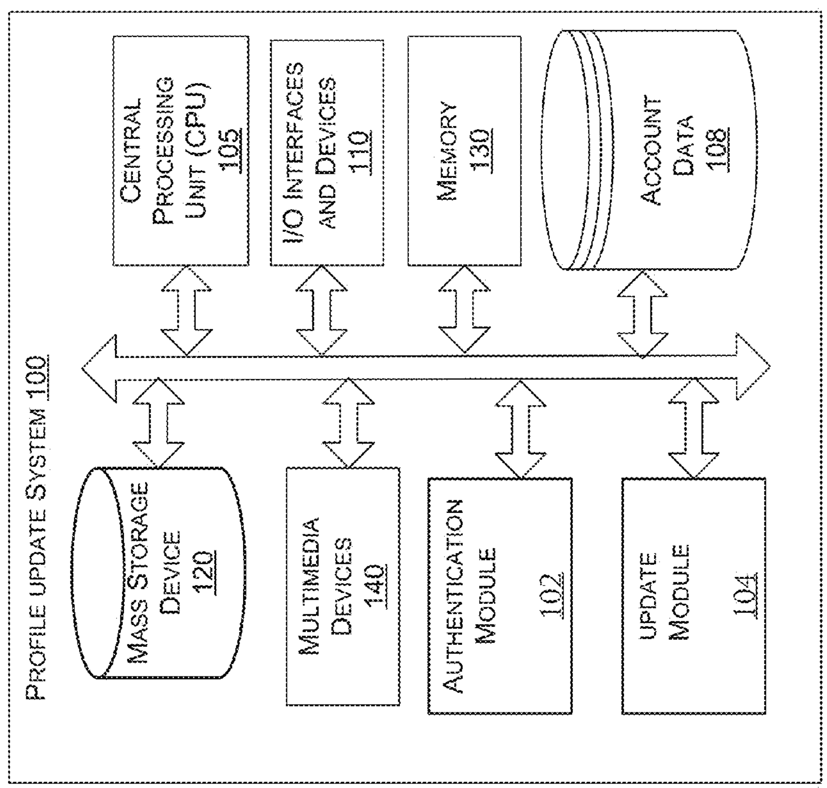
FIG. 6 is a block diagram showing example components of a profile update system.

FIG. 6 is a block diagram showing example components of a profile update system 100. The authentication module 102 and update module 104 of the system 100 may include software code configured for execution by the profile update system 100 to perform the various features discussed herein. Depending on the embodiment, the features discussed herein may be performed by a combination of computing devices, such as a server and a mobile computing device. The profile update system 100 may include these multiple devices.

The computing system 100 includes, for example, one or more personal computer that is Windows, Macintosh, or Linux/Unix compatible or a server or workstation. In one embodiment, the computing system 100 comprises a server, a laptop computer, a smart phone, a personal digital assistant, a kiosk, or a media player, for example. In one embodiment, the exemplary computing system 100 includes one or more central processing unit ("CPU") 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected to the computer using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 6, the I/O devices and interfaces 110 provide a communication interface to various external devices. In the embodiment of FIG. 6, the computing system 100 is electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the various entities to which updated profile information is to be sent.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. As noted above, the authentication module 102 may initiate and/or perform authentication of a user, primarily to determine whether the user that is requesting profile information and/or providing profile information really is the user identified in such information. The update module 104 may perform various tasks, such as interfacing with a user to receive updates to profile information, comparing updates to profile information stored at the profile update system 100 and/or at one or more other remote databases, and determine which remote databases profile updates should be provided to (whether such profile updates are automatically detected by the update module 104 or the updates are provided directly from an authenticated user). These modules may perform fewer or additional tasks in various embodiments. Similarly, the modules may be stored and executed on separate computing devices, even computing devices that are not co-located.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A computing system configured to access a plurality of remote databases in order to identify data inconsistencies between the remote databases and provide user interfaces to a user in order to initiate communication via one or more APIs to certain remote databases indicating updates that reconcile said data inconsistencies, the computing system comprising:

one or more storage devices configured to store electronic software instructions; and one or more computer processors in communication with the one or more storage devices, the one or more computer processors configured to execute the stored electronic software instructions to cause the computing system to automatically:

access, over a network, first user information stored in the one or more storage devices, the first user information including indications of each of a plurality of remote databases having data regarding a first user, the first user information also including:

a plurality of data fields; and a corresponding plurality of master data values associated with respective data fields;

access a first remote database of the plurality of remote databases via an application programming interface in communication with the first remote database over the network;

determine first remote data associated with the first user stored in the first remote database;

compare the first remote data to the first user information by comparing a plurality of master data values in the first user information to corresponding remote data values of remote data fields;

identify a particular master data value in a particular data field that does not match a corresponding remote data value in an associated remote data field;

generate an interactive user interface for transmission to a remote user computing device, the interactive user interface including authentication prompts usable to authenticate an identity of the first user;

receive input from the remote user computing device;

compare the input from the remote user computing device to expected authentication information associated with the first user;

in response to determining that the expected authentication information matches the input from the remote user computing device, authenticate the first user;

generate a second interactive user interface for transmission to the remote user computing device, the second interactive user interface including:

the particular master data value;

the corresponding remote data value; and a first interactive user interface control usable by the first user to instruct the computing system to update the particular master data value with the corresponding remote data value from the first remote data;

in response to receiving an indication via the second user interface that the first user selected the first interactive user interface control, update the particular master data value in the first user information with the corresponding remote data value from the first remote data;

identify a subset of the plurality of remote databases that each do not include the corresponding remote data value, said identifying comprising, for each of the plurality of remote databases:

accessing the remote database using security protocols and/or communication protocols, over the network;

determining a remote data value in a remote data field corresponding to the particular data field in the remote database;

determining whether the corresponding remote data value is included in the updated master data value; and if the remote data value is not included in the updated master data value, including the remote database in a subset of remote databases for which updates are available;

generate a third user interface for transmission to the remote user computing device, the third user interface including:

an indication of the subset of remote databases for which updates are available; and a second interactive user interface control usable to select one or more of the subset of remote databases; and in response to receiving an indication of a selected one or more of the subset of remote databases from the remote user computing device, for each of the selected one or more remote databases:

determine security protocols and/or communication; and using the determined security protocols and/or communication protocols, transmit the updated master data value to the selected remote database in order to initiate an update at the selected remote databases.

2. The computing system of claim 1, wherein the authentication prompts display a request for information regarding data of the first user identified in a credit report of the first user.

3. The computing system of claim 1, wherein said accessing the first remote database comprises:

accessing first access information in the one or more storage device, the first access information indicating one or more communication parameters for accessing the first remote database.

4. The computing system of claim 3, wherein the one or more communication parameters comprise APIs, security protocols and/or communication protocols used to communicate to the first remote database over the network.

5. The computing system of claim 1, wherein the network comprises one or more of: LAN, WAN, or Internet.

6. A method comprising:

accessing, over a network, first user information stored in one or more storage devices, the first user information including indications of each of a plurality of remote databases having data regarding a first user, the first user information also including:

a plurality of data fields; and a corresponding plurality of master data values associated with respective data fields;

accessing a first remote database of the plurality of remote databases via an application programming interface in communication with the first remote database over the network;

determining the first remote data associated with the first user stored in the first remote database;

comparing the first remote data to the first user information by comparing a plurality of master data values in the first user information to corresponding remote data values of remote data fields;

identifying a particular master data value in a particular data field that does not match a corresponding remote data value in an associated remote data field;

generating an interactive user interface for transmission to a remote user computing device, the interactive user interface including authentication prompts usable to authenticate an identity of the first user;

receiving input from the remote user computing device;

comparing the input from the remote user computing device to expected authentication information associated with the first user;

in response to determining that the expected authentication information matches the input from the remote user computing device, authenticating the first user;

generating a second interactive user interface for transmission to the remote user computing device, the second interactive user interface including:

the particular master data value;

the corresponding remote data value; and a first interactive user interface control usable by the first user to instruct a computing system to update the particular master data value with the corresponding remote data value from the first remote data;

in response to receiving an indication via the second user interface that the first user selected the first interactive user interface control, updating the particular master data value in the first user information with the corresponding remote data value from the first remote data;

identifying a subset of the plurality of remote databases that each do not include the corresponding remote data value, said identifying comprising, for each of the plurality of remote databases:

accessing the remote database using security protocols and/or communication protocols, over the network;

determining, a remote data value in a remote data field corresponding to the particular data field in the remote database;

determining whether the corresponding remote data value is included in the updated master data value;

if the remote data value is not included in the updated master data value, including the remote database in a subset of remote databases for which updates are available;

generating a third user interface for transmission to the remote user computing device, the third user interface including:

an indication of the subset of remote databases for which updates are available; and a second interactive user interface control usable to select one or more of the subset of remote databases; and in response to receiving an indication of a selected one or more of the subset of remote databases from the remote user computing device, for each of the selected one or more remote databases:

determining security protocols and/or communication protocols; and using the determined security protocols and/or communication protocols, transmitting the updated master data value to the selected remote database in order to initiate an update at the selected remote database.

7. The method of claim 6, wherein the authentication prompts display a request for information regarding data of the first user identified in a credit report of the first user.

8. The method of claim 6, wherein said accessing the first remote database comprises:

accessing first access information in the one or more storage device, the first access information indicating one or more communication parameters for accessing the first remote database.

9. The method of claim 8, wherein the one or more communication parameters comprise APIs, security protocols and/or communication protocols used to communicate to the first remote database over the network.

10. The method of claim 8, wherein the network comprises one or more of: LAN, WAN, or Internet.

11. A non-transitory computer-readable medium storing instructions configured to cause one or more computer processors to perform operations comprising:

accessing, over a network, first user information stored in the one or more storage devices, the first user information including indications of each of a plurality of remote databases having data regarding a first user, the first user information also including:

a plurality of data fields; and a corresponding plurality of master data values associated with respective data fields;

accessing a first remote database of the plurality of remote databases via an application programming interface in communication with the first remote database over the network;

determining the first remote data associated with the first user stored in the first remote database;

comparing the first remote data to the first user information by comparing a plurality of master data values in the first user information to corresponding remote data values of remote data fields;

identifying a particular master data value in a particular data field that does not match a corresponding remote data value in an associated remote data field;

generating an interactive user interface for transmission to a remote user computing device, the interactive user interface including authentication prompts usable to authenticate an identity of the first user;

receiving input from the remote user computing device;

comparing the input from the remote user computing device to expected authentication information associated with the first user;

in response to determining that the expected authentication information matches the input from the remote user computing device, authenticating the first user;

generating a second interactive user interface for transmission to the remote user computing device, the second interactive user interface including:

the particular master data value;

the corresponding remote data value; and a first interactive user interface control usable by the first user to instruct a computing system to update the particular master data value with the corresponding remote data value from the first remote data;

in response to receiving an indication via the second user interface that the first user selected the first interactive user interface control, updating the particular master data value in the first user information with the corresponding remote data value from the first remote data;

identifying a subset of the plurality of remote databases that each do not include the corresponding remote data value, said identifying comprising, for each of the plurality of remote databases:

accessing the remote database using security protocols and/or communication protocols, over the network;

determining, a remote data value in a remote data field corresponding to the particular data field in the remote database;

determining whether the corresponding remote data value is included in the updated master data value;

if the remote data value is not included in the updated master data value, including the remote database in a subset of remote databases for which updates are available;

generating a third user interface for transmission to the remote user computing device, the third user interface including:

an indication of the subset of remote databases for which updates are available; and a second interactive user interface control usable to select one or more of the subset of remote databases; and in response to receiving an indication of a selected one or more of the subset of remote databases from the remote user computing device, for each of the selected one or more remote databases:

determining security protocols and/or communication protocols; and using the determined security protocols and/or communication protocols, transmitting the updated master data value to the selected remote database in order to initiate an update at the selected remote database.

12. The non-transitory computer-readable medium of claim 11, wherein the authentication prompts display a request for information regarding data of the first user identified in a credit report of the first user.

13. The non-transitory computer-readable medium of claim 11, wherein said accessing the first remote database comprises:

accessing first access information in the one or more storage device, the first access information indicating one or more communication parameters for accessing the first remote database.

14. The non-transitory computer-readable medium of claim 13, wherein the one or more communication parameters comprise APIs, security protocols and/or communication protocols used to communicate to the first remote database over the network.

15. The non-transitory computer-readable medium of claim 11, wherein the network comprises one or more of: LAN, WAN, or Internet.

* * * * *

UNITED STATES PATENT AND TRADEMARK OFFICE

CERTIFICATE OF CORRECTION

PATENT NO. : 9,477,737 B1
APPLICATION NO. : 14/548016
DATED : October 25, 2016
INVENTOR(S) : Mike Charyk et al.

It is certified that error appears in the above-identified patent and that said Letters Patent is hereby corrected as shown below:

On the Title Page

In Column 1 (page 10, item (56)) at Line 55, Under Other Publications, change “Colombus” to --Columbus--.

In the Specification

In Column 2 at Line 21, Change “eXtendible” to --eXtensible--.

In Column 7 at Line 15 (approx.), Change “that that” to --that--.

In the Claims

In Column 14 at Line 39, In Claim 1, change “communication;” to --communication protocols;--.

In Column 14 at Lines 44-45, In Claim 1, change “databases.” to --database.--.

Signed and Sealed this
Thirtieth Day of May, 2017

Michelle K. Lee
*Director of the United States Patent and Trademark Office*